US012525350B2

(12) United States Patent
Maslik et al.

(10) Patent No.: US 12,525,350 B2
(45) Date of Patent: Jan. 13, 2026

(54) SYSTEMS, APPARATUS AND METHODS FOR ACQUISITION, STORAGE, AND ANALYSIS OF HEALTH AND ENVIRONMENTAL DATA

(71) Applicants: Circadia Technologies Ltd., London (GB); Circadia Health, Inc., Inglewood, CA (US)

(72) Inventors: Michal Maslik, London (GB); Timo Lauteslager, London (GB); Fares Siddiqui, London (GB); Stylianos Kampakis, London (GB); Guy Doron Leschziner, London (GB)

(73) Assignees: Circadia Technologies Ltd., London (GB); Circadia Health, Inc., El Segundo, CA (US)

( * ) Notice: Subject to any disclaimer, the term of this patent is extended or adjusted under 35 U.S.C. 154(b) by 0 days.

(21) Appl. No.: 18/637,374

(22) Filed: Apr. 16, 2024

(65) Prior Publication Data

US 2024/0266046 A1 Aug. 8, 2024

Related U.S. Application Data

(63) Continuation of application No. 17/350,989, filed on Jun. 17, 2021, now abandoned.
(Continued)

(51) Int. Cl.
*G16H 40/67* (2018.01)
*A61B 5/00* (2006.01)
(Continued)

(52) U.S. Cl.
CPC ............. *G16H 40/67* (2018.01); *A61B 5/002* (2013.01); *A61B 5/0205* (2013.01);
(Continued)

(58) Field of Classification Search
CPC ..... A61B 5/002; A61B 5/0022; A61B 5/4806; A61B 5/4809; A61B 5/4812; A61B 5/4815; A61B 5/4818
(Continued)

(56) References Cited

U.S. PATENT DOCUMENTS

| 8,562,526 | B2 | 10/2013 | Heneghan et al. |
| 8,740,793 | B2 * | 6/2014 | Cuddihy ............... A61B 5/4806 600/301 |

(Continued)

FOREIGN PATENT DOCUMENTS

WO WO-2019230305 A1 * 12/2019 ........... A61B 5/0507

OTHER PUBLICATIONS

A. D. Droitcour, T. B. Seto, B. Park, S. Yamada, C. Elhourani. T. Shing. A. Yuen. VM. Lubecke, and O. Boric-Lubecke, Non-Contact Respiratory Rate Measurement Validation for Hospitalized Patients, Sep. 2-6, 2009, 4 pages, 31st Annual International Conference of the IEEE EMBS, Minneapolis, Minnesota, USA.
(Continued)

*Primary Examiner* — John R Downey
(74) *Attorney, Agent, or Firm* — Levine Bagade Han LLP

(57) ABSTRACT

A system for monitoring health of a patient includes a touchless sensing device disposed within a sensing range of the patient. The touchless sensing device includes at least one touchless sensor configured to receive raw data relating to the health status of the patient. The system also includes at least one processor configured to receive the raw data from the touchless sensor or sensors, compute physiological data from the raw data, compute health metrics from the physiological data, and display the health metrics or the physiological data on a display device in communication with the at least one processor.

21 Claims, 11 Drawing Sheets

Related U.S. Application Data

(60) Provisional application No. 63/041,064, filed on Jun. 18, 2020.

(51) Int. Cl.

| | | |
|---|---|---|
| *A61B 5/0205* | (2006.01) | |
| *A61B 5/05* | (2021.01) | |
| *A61B 5/11* | (2006.01) | |
| *G16H 10/60* | (2018.01) | |
| *G16H 15/00* | (2018.01) | |
| *G16H 50/30* | (2018.01) | |
| *H04L 67/12* | (2022.01) | |

(52) U.S. Cl.
CPC .......... *A61B 5/4815* (2013.01); *A61B 5/4842* (2013.01); *A61B 5/742* (2013.01); *G16H 10/60* (2018.01); *G16H 15/00* (2018.01); *G16H 50/30* (2018.01); *A61B 5/0059* (2013.01); *A61B 5/05* (2013.01); *A61B 5/11* (2013.01); *A61B 2505/07* (2013.01); *A61B 2562/0204* (2013.01); *A61B 2562/0257* (2013.01); *H04L 67/12* (2013.01)

(58) Field of Classification Search
USPC .................................................. 600/300, 301
See application file for complete search history.

(56) References Cited

U.S. PATENT DOCUMENTS

| | | | |
|---|---|---|---|
| 10,292,625 B2* | 5/2019 | Shinar | A61B 5/6891 |
| 10,863,906 B2 | 12/2020 | Mcmahon et al. | |
| 2010/0249630 A1 | 9/2010 | Droitcour et al. | |
| 2014/0046184 A1* | 2/2014 | Heinrich | A61B 7/003 |
| | | | 600/595 |
| 2015/0265204 A1* | 9/2015 | Tupin, Jr. | G01S 13/88 |
| | | | 600/301 |
| 2016/0022204 A1* | 1/2016 | Mostov | A61B 5/7282 |
| | | | 600/301 |
| 2016/0157780 A1 | 6/2016 | Rimminen et al. | |
| 2017/0128003 A1* | 5/2017 | Lim | G16H 20/70 |
| 2018/0078735 A1* | 3/2018 | Dalgleish | G06F 3/165 |
| 2019/0108913 A1* | 4/2019 | Coke | A61B 5/0507 |
| 2019/0254570 A1 | 8/2019 | Shinar et al. | |
| 2019/0391250 A1* | 12/2019 | Cohen | G01S 13/87 |
| 2020/0178892 A1 | 6/2020 | Maslik et al. | |
| 2020/0245873 A1* | 8/2020 | Frank | A61B 5/0823 |
| 2020/0367810 A1* | 11/2020 | Shouldice | H04R 1/08 |
| 2020/0383611 A1* | 12/2020 | Inoue | A61B 5/1116 |

OTHER PUBLICATIONS

A. Lazaro, D. Girbau and R. Villarino, Analysis of Vital Signs Monitoring Using an IR-UWB Radar, 2010, 20 Pages, Progress in Electromagnetics Research, PIER 100.

A.L. Rosenberg, "Patients Readmitted to ICUs a Systematic Review of Risk Factors and Outcomes", Aug. 2000, 11 pages, CHEST, 118, 2.

D.R. Goldhill et al., A physiologically-based early warning score forward patients: the association between score and outcome, 2005, 7 pages, Blackwell Publishing Ltd, Anesthesia.

D.R. Goldhill et al., Physiological values and procedures in the 24 h before ICU admission from the ward, 1999, 6 pages, Blackwell Science Ltd, Anesthesia.

Domenico Zito, Domenico Pepe, Martina Mincica, Fabio Zito, Alessandro Tognetti, Antonio Lanata and Danilo De Rossi, SoC CMOS UWB Pulse Radar Sensor for Contactless Respiratory Rate Monitoring, Dec. 2011, 8 pages, IEEE Transactions on Biomedical Circuits and Systems, vol. 5 No. 6.

F. Cheng, "Using Machine Learning to Predict ICU Transfer in Hospitalized COVID-19 Patients", Jun. 1, 2020, 12 pages, *Journal of Clinical Medicine*, MDPI.

Franciosi et al., Markers of exacerbation severity in chronic obstructive pulmonary disease, May 10, 2006, 14 pages, Respiratory Research, BioMed Central.

I. Immoreev and T. Tao, UWB Radar for Patient Monitoring, Nov. 2008, 8 pages, IEEE A&E Systems Magazine.

JF. Fieselmann, MS. Hendryx, CM. Helms, and DWWakefield, Respiratory Rate Predicts Cardiopulmonary Arrest for Internal Medicine Inpatients, 1993, 7 pages, Journal of General Internal Medicine, vol. 8.

JP. McFadden, RC. Price, HD. Eastwood and RS. Briggs, Raised respiratory rate in elderly patients: a valuable physical sign, Feb. 27, 1982, 2 pages, British Medical Journal, vol. 284.

M. Churpek et al., "Predicting Cardiac Arrest on the Wards a Nested Case-Control Study", May 2012, 7 pages, *American College of Chest Physicians*, CHEST, 101, 5.

Margeaux M. Schade, Christopher E. Bauer, Billie R. Murray, Luke Gahan, Emer P. Doheny, Hannah Kilroy, Alberto Zaffaroni, Hawley E Montgomery-Downs, Sleep Validity of a Non-Contact Bedside Movement and Respiration-Sensing Device, Jul. 15, 2019, 11 pages, Journal of Clinical Sleep Medicine, vol. 15, No. 7, https://dx.doi.org/10.5664/icsm.7892.

S. Shashikumar, "Development and Prospective Validation of a Deep Learning Algorithm for Predicting Need for Mechanical Ventilation", Jun. 2021, 10 pages, CHEST.

T. Chen et al., Clinical characteristics of 113 deceased patients with coronavirus disease 2019: retrospective study, Mar. 26, 2020, 12 pages, BMJ.

T. Lauteslager et al., "Validation of a New Contactless and Continuous Respiratory Rate Monitoring Device Based on Ultra-Wideband Radar Technology", Jun. 11, 2021, 15 pages, MDPI, Sensors.

Yanez et al, Monitoring Breathing Rate at Home Allows Early Identification of COPD Exacerbations, Dec. 2012, 6 pages, Journal Publications, Chest, 142, 6.

Zhuo Sun et al., Postoperative Hypoxemia Is Common and Persistent: A Prospective Blinded Observational Study, Sep. 2015, 7 pages, Anesthesia-Analgesia, International Anesthesia Research Society, vol. 121, No. 3.

\* cited by examiner

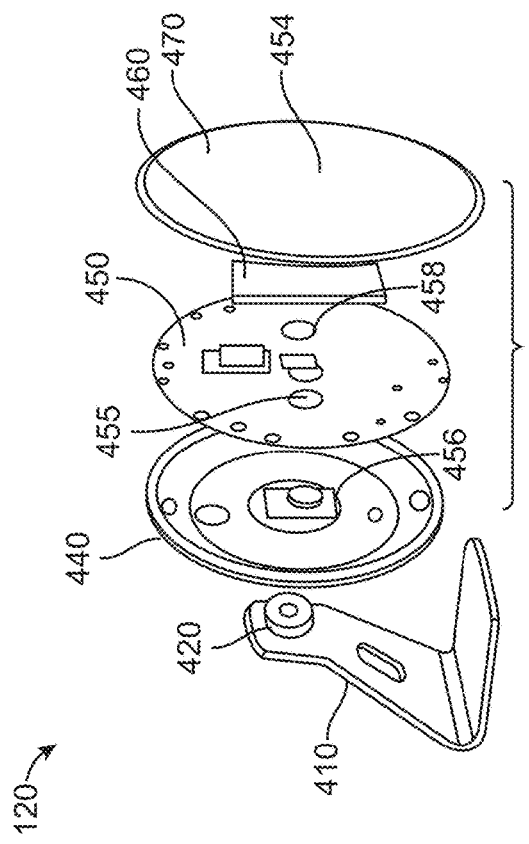
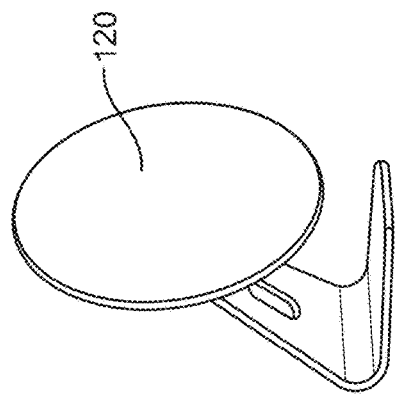
FIG. 4A
FIG. 4B
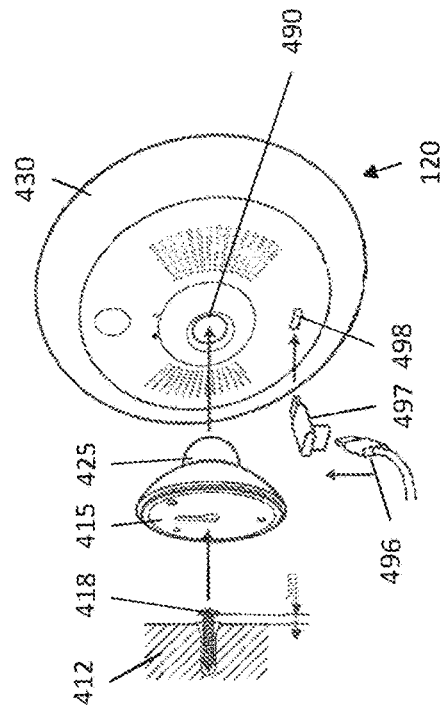
Figure 4C
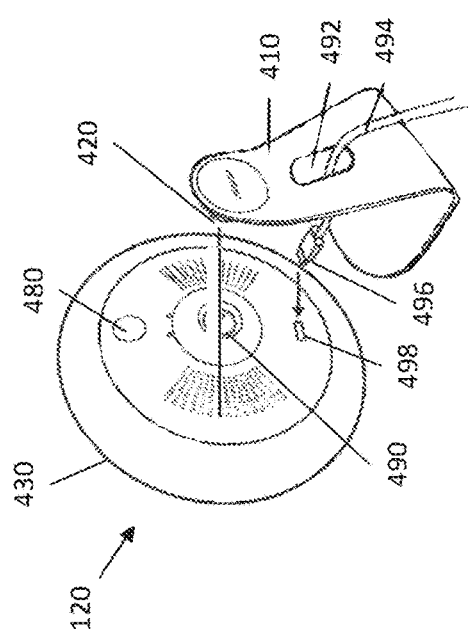
Figure 4D

SYSTEMS, APPARATUS AND METHODS FOR ACQUISITION, STORAGE, AND ANALYSIS OF HEALTH AND ENVIRONMENTAL DATA

CROSS REFERENCE TO RELATED APPLICATIONS

This application claims the priority benefit of U.S. Provisional Patent Application No. 63/041,064 filed 18 Jun. 2020, hereby incorporated by reference in its entirety as though fully set forth herein.

TECHNICAL FIELD

The subject matter described herein relates to apparatus and methods for continuous, long-term monitoring of vital signs, environment data, and sleep. This vital sign monitoring system has particular but not exclusive utility for monitoring patients in home and clinical settings.

BACKGROUND

Continuous and long-term monitoring of vital signs and sleep in low acuity settings such as the general ward, skilled nursing facility, inpatient rehabilitation facility, or home, may be challenging with conventional monitoring standards and technology. The current clinical standard for respiratory rate monitoring in low acuity settings is a manual spot check, typically performed every 4-8 hours by a nurse. Sleep monitoring may not be part of standard clinical practice at all, unless a suspicion exists of a sleep disorder.

Contact-based continuous monitoring technologies exist (e.g., electrodes, wearables, finger probes), but may be uncomfortable. Consequently, patients may be unlikely to adhere to long-term monitoring, unless enforced by healthcare facility staff. Patient monitoring in the home environment may be particularly challenging, as it may involve limited contact between staff and patient, causing low adherence. Existing devices often require trained staff for device setup. In addition, the home environment poses challenges such as patients having a bed partner, which may confound monitor signal quality.

Despite these challenges, there are clear indications that continuous monitoring can be beneficial for early detection of adverse events in various healthcare settings. Accordingly, a need exists for vital sign monitoring systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

The vital sign monitoring system disclosed herein has particular, but not exclusive, utility for continuous monitoring of patient vital signs, sleep, behavior, and environmental data, using multiple sensors including radar, and their transmission to remote cloud storage, for health and sleep monitoring and behavioral analysis. The vital sign monitoring system comprises a device that includes multiple sensors to continuously acquire user motion, physiological, and behavior data, as well as environmental data. Data may be processed on the device using embedded algorithms. Raw data and processed data may be stored on the device. Raw data and processed data may also be transmitted for remote storage and processing.

The vital sign monitoring system disclosed herein has shown particular utility in continuous monitoring of patients suffering from COVID-19 infection.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for monitoring health of a patient. The system includes a touchless sensing device disposed within a sensing range of the patient, where the touchless sensing device includes at least one touchless sensor configured to receive raw data relating to a health status of the patient; and at least one processor configured to: receive the raw data from the at least one touchless sensor, compute physiological data from the raw data, compute health metrics from the physiological data, and display the health metrics or the physiological data on a display device in communication with the at least one processor. Other embodiments of this aspect include corresponding computer systems, apparatus, and computer programs recorded on one or more computer storage devices, each configured to perform the actions of the methods.

Implementations may include one or more of the following features. In some embodiments, the at least one touchless sensor includes at least one of a radar sensor, an ultrasonic sensor, a light sensor, or a microphone, and the raw data includes motion data and proximity data of the patient. In some embodiments, the at least one touchless sensor is configured to receive raw data relating to the health status of the patient at a plurality of distances within the sensing range. In some embodiments, the physiological data includes at least one of heart rate, cardiac waveform, respiration rate, respiration waveform, movement data, or sleep. In some embodiments, the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, or a mood. In some embodiments, the health metrics include behavioral metrics including at least one of a time spent in bed, a time spent in a patient room away from the bed, movements or activities throughout the patient room, bed exits and entries, falls, immobile minutes in bed, or changes of position. In some embodiments, at least a portion of the network includes a mesh network. In some embodiments, at least one processor of the at least one processor is disposed within the touchless sensing device. In some embodiments, at least one processor of the at least one processor is accessible by the touchless sensing device via a network. In some embodiments, the display device includes a desktop computer, laptop computer, notebook computer, tablet computer, smartphone, smart watch or smart glasses. In some embodiments, computing the physiological data from the raw data involves excluding raw sensor data from people other than the patient or sources of motion other than the patient. In some embodiments, displaying the health metrics or physiological data includes displaying at least one of statistics, trends, alerts, insights, diagnostics, or visualizations. In some embodiments, the health metrics include at least one of tachypnea bradypnea respiratory rate variability, tachycardia, bradycardia, heart rate variability, an upward or downward trend in respiration rate, an R score, a breathing obstruction, a shortness of breath, a ventilatory depression, apnea, a hypopenea, Kussmaul breathing, ataxic breathing, Biot breathing, Cheyne-Stokes breathing, periodic breathing, air trapping, sighing, apneustic breathing, or agonal breathing. In some embodiments, the health metrics or vital signs monitor a progression of covid-19 symptoms. Implementations of the described techniques may include hardware, a method or process, or computer software on a computer-accessible medium.

One general aspect includes a method for monitoring health of a patient. The method includes, with a touchless sensing device disposed within a sensing range of the patient and including at least one touchless sensor, receiving raw data relating to the health status of the patient at a plurality of distances within the sensing range; and with at least one processor receiving the raw data from the at least one touchless sensor, computing physiological data from the raw data, computing health metrics from the physiological data, and displaying the health metrics or the physiological data on a display device in communication with the at least one processor. Other embodiments of this aspect include corresponding computer systems, apparatus, and computer programs recorded on one or more computer storage devices, each configured to perform the actions of the methods.

Implementations may include one or more of the following features. In some embodiments, the at least one touchless sensor includes at least one of a radar sensor, an ultrasonic sensor, a light sensor, or a microphone, and the raw data includes motion data and proximity data of the patient, and where the physiological data includes at least one of heart rate, cardiac waveform, respiration rate, respiratory waveform movement data, or sleep. In some embodiments, the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, a mood, tachypnea, bradypnea, respiratory rate variability, tachycardia, bradycardia, heart rate variability, an upward or downward trend in respiration rate, an R score, a breathing obstruction, a shortness of breath, a ventilatory depression, apnea, a hypopenea. Kussmaul breathing, ataxic breathing, Biot breathing. Cheyne-stokes breathing, periodic breathing, air trapping, sighing, apneustic breathing, agonal breathing, statistics, trends, alerts, insights, diagnostics, or visualizations, or behavioral metrics including at least one of a time spent in bed, a time spent in a patient room away from the bed, movements or activities throughout the patient room, bed exits and entries, falls, immobile minutes in bed, or changes of position. In some embodiments, at least one processor of the at least one processor is accessible by the touchless sensing device via a network, and at least a portion of the network includes a mesh network. In some embodiments, the display device includes a desktop computer, laptop computer, notebook computer, tablet computer, smartphone, smart watch, or smart glasses. In some embodiments, computing the physiological data from the raw data involves excluding raw sensor data from people other than the patient or movement sources other than the patient. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the vital sign monitoring system is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 4A is a perspective view of the apparatus, in accordance with at least one embodiment of the present disclosure.

FIG. 4B is a perspective, exploded view of the apparatus, in accordance with at least one embodiment of the present disclosure.

FIG. 4C is a perspective view illustrating the apparatus with magnetic connection to a stand, in accordance with at least one embodiment of the present disclosure.

FIG. 4D is a perspective view illustrating magnetic connection of the apparatus to a wall mount, in accordance with at least one embodiment of the present disclosure.

DETAILED DESCRIPTION

Figure 1:
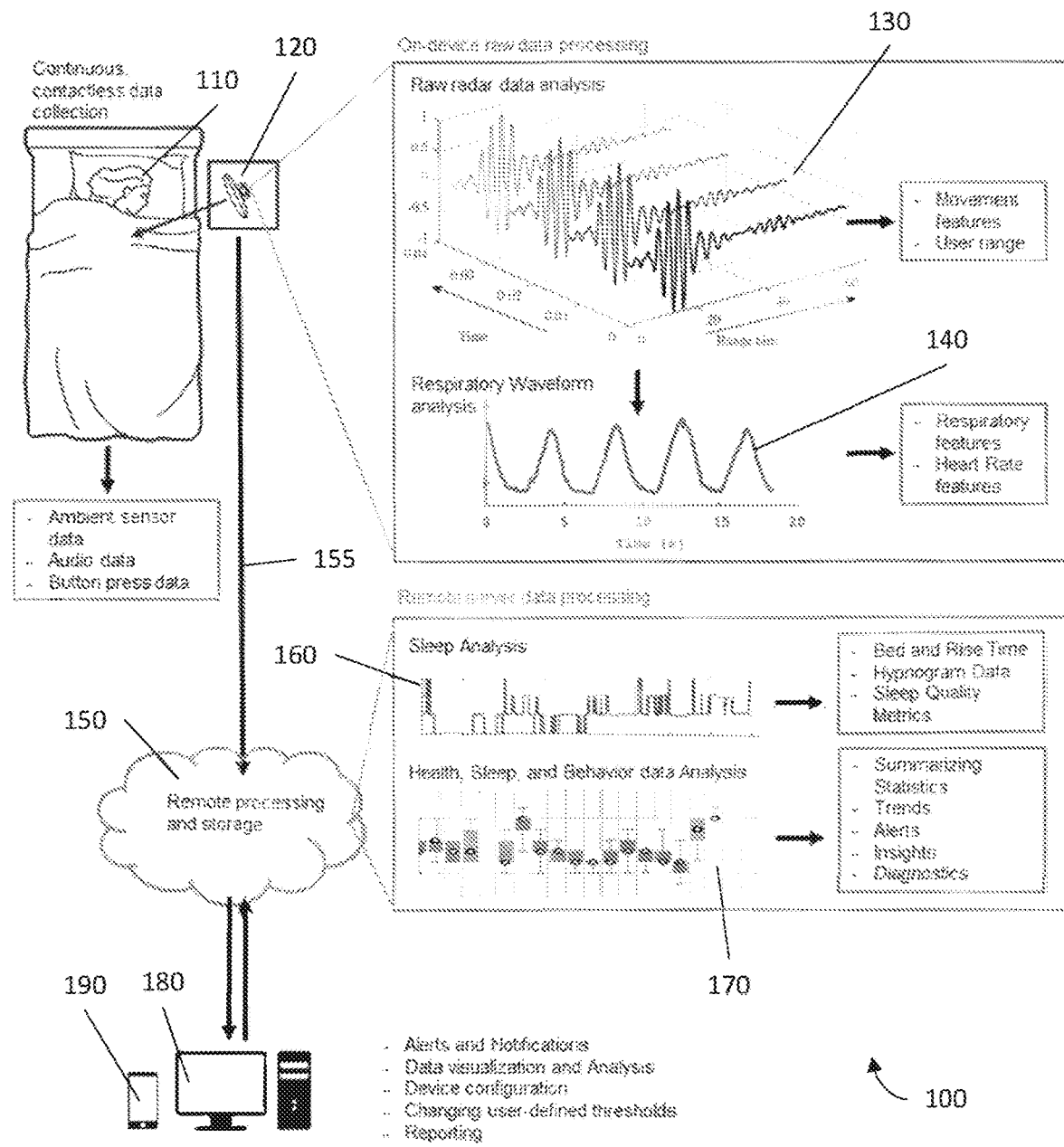
FIG. 1 is a schematic system overview, in accordance with at least one embodiment of the present disclosure.

In accordance with at least one embodiment of the present disclosure, a vital sign monitoring system is provided which enables continuous monitoring of patient vital signs, sleep, behavior, and environmental data using multiple sensors including radar, and their transmission to remote cloud storage, for health and sleep monitoring and behavioral analysis.

A number of wearable and "nearable" continuous monitoring devices exist. These are often attached to the patient bed or mattress (in case of pressure and accelerometer type sensors), or placed beside the bed. Existing systems may suffer from numerous disadvantages.

Sensor systems that attach to the mattress or bed (e.g., pressure sensors, piezo sensors, or accelerometers) may be accurate for vital sign monitoring, but may not be able to record bedroom environment data, perform well when a bedpartner is present, or track the user throughout the room. They may also be high in cost.

Radar-based devices, although potentially accurate for respiration monitoring, can be based on continuous wave doppler radar architectures. Continuous wave Doppler radar may not be able to distinguish between signals recorded at different distances to the device (for example, two persons in bed). Radar-based devices can also be based on pulsed radar. Time-gating (or range-gating) can be applied to pulsed radar to limit the detection range to the specific distance where the patient is expected to be. When applying time-gating in hardware, signals originating from distances outside of the detection range may be filtered out completely. The disadvantage of applying time-gating in hardware is that it may not be possible to monitor the patient when they reposition to a different distance to the device. This may happen in a home-scenario, as people move around furniture, and move around their house. In addition, when using continuous wave radar, it is not possible to simultaneously monitor a patient and their bed partner. Simultaneous two-person monitoring would allow for distinguishing between physiological signals originating from different people, with improved signal separation capabilities.

Optical monitoring systems may require direct line of sight, light, and are often perceived as violating a patient's privacy. In addition, video data processing is computationally expensive.

Thus, a need exists for contactless systems that are able to continuously monitor and analyze user health, sleep, behavior and bedroom environment. The present disclosure includes an apparatus for non-contact acquisition of human physiological data and environmental data, methods for on-device signal extraction, methods for transmission to remote storage and processing, methods for data analysis, and methods for long term monitoring of patients in a health care setting as well as notification and alert methods. The vital sign monitoring system disclosed herein has particular, but not exclusive, utility for continuous monitoring of vital signs, sleep, behavior, and environmental data, using multiple sensors including radar, and their transmission to remote cloud storage, for health and sleep monitoring and behavioral analysis. The vital sign monitoring system comprises a device that includes multiple sensors to continuously acquire user motion, physiological, and behavior data as well as environmental data. Data may be processed on the device using embedded algorithms. Raw data and processed data may be stored on the device. Raw data and processed data may also be transmitted for remote storage and processing.

The present disclosure aids substantially in patient monitoring, by improving contactless access to multiple physiological and behavioral variables. Implemented on an apparatus in communication with a remote processor, the vital sign monitoring system disclosed herein provides practical touchless physiological and behavioral monitoring. This improved patient monitoring transforms a limited, uncomfortable, and uncertain monitoring process into one that happens seamlessly, without the normally routine need for the patient to play an active role in the monitoring. This unconventional approach improves the functioning of the clinical or home health care environment, by allowing local or remote health care providers ready access to physiological and behavioral variables.

The vital sign monitoring system may be implemented as a series of monitored or computed variables, viewable on a display, and operated by a control process executing on a processor that accepts user inputs from a keyboard, mouse, or touchscreen interface, and that is in communication with one or more remote processors. In that regard, the control process performs certain specific operations in response to different inputs or selections made at different times.

Respiratory rate (RR) has been shown to be an early indicator for a wide range of complications, and high RR is known to be a predictor for admission into the intensive care unit, as well as for hospital mortality. The diagnosis of tachypnea (elevated RR), one of the earliest signs of pulmonary decompensation, may be considerably delayed when relying on routine spot measurements. The challenge with infrequent vital sign monitoring has become even more apparent for patients suffering from COVID-19, as a fraction of patients deteriorate rapidly and unexpectedly. As with other infections, RR is often the first vital sign to change when a patient starts to deteriorate. In hospitalized COVID-19 patients, RR was found to be the strongest predictor of ICU transfer, and for need of mechanical ventilation. A continuous system for RR monitoring, such as the current disclosure, could alert healthcare professionals of tachypnea and decompensation far earlier than when depending on spot measurements Recognition of even subtle changes in basic vital signs may allow clinicians to detect deterioration well before serious adverse events occur.

The vital sign monitoring system has been validated and found to be accurate for RR monitoring, and is used at present for continuous RR monitoring of patients in nursing homes in the US. Nursing homes have been shown to be extremely vulnerable to outbreaks of COVID-19. The system of the current disclosure has been shown to detect the changes to respiratory state that accompany a COVID-19 infection, and often even precede fever onset. The system has also been used to send timely alerts to nursing home healthcare professionals, to warn them of cases of tachypnea, in some cases before a subsequent COVID-19 diagnosis.

These descriptions are provided for exemplary purposes only, and should not be considered to limit the scope of the vital sign monitoring system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic overview of an example vital sign monitoring system 100, in accordance with at least one embodiment of the present disclosure. FIG. 1 shows a schematic of the entire example system, including high level processes and different data obtained. The vital sign monitoring system 100 includes a measurement apparatus or device 120 capable of monitoring a user 110. The measurement apparatus or device 120 may comprise multiple sensors to continuously acquire user information which may for example include user motion, physiological data, behavior data, and environmental data. In some embodiments, data may be processed on the device using embedded algorithms. In some embodiments, raw data and processed data may be stored on the device. Raw data and processed data may also be transmitted for remote storage and processing.

The apparatus or device 120 captures raw data 130 (e.g., ambient sensor data, audio data, button press data, etc.) from the plurality of sensors, and may perform waveform analysis to yield processed data 140, which may for example include respiration, heart rate, movement, mood, other physiological variables, environmental variables, or other information. In an exemplary embodiment, the system 100 employs four different raw data types whose importance may be ranked as follows: 1, health (physiological, such as respiration rate and heart rate), 2. Behavioral (movement, bed presence, bed exits, falls), 3. Sleep, and 4. Environmental (light, sound). Other rankings and combinations may be used instead or in addition, and such rankings and combinations and fall within the scope of the present disclosure.

The raw data 130 and/or the processed data 140 may then be transferred to a remote processing and storage unit 150 (e.g., over a network 155 such as a local area network (LAN), wide area network (WAN), wireless network, cellular network, etc). The remote processing and storage unit 150 may then analyze the raw data 130 and/or processed data 140 to yield a sleep analysis 160 (e.g., a hypnogram, bed and rise times, sleep quality metrics), a combined health, sleep, and behavior analysis 170 (e.g., statistics, summaries, trends, alerts, insights, and diagnostics), and/or other analyses of health, behavior, environment, sleep, physiology, or combinations thereof. The analyses 160 and 170 may then be transferred (e.g., over the network 155) to a computer 180 (e.g., a desktop, laptop, or notebook computer) or mobile device 190 (e.g., a smartphone, tablet, smart watch, smart glasses, etc.) for display and/or storage. Software on the computer 180 or mobile device 190 may also provide alerts and notifications providing user advice, such as recommended actions to improve health or sleep. Software on the computer 180 or mobile device 190 may also provide data visualization and analysis, device configuration, user-defined thresholds, and reporting.

Continuous and long-term monitoring of vital signs in low acuity settings such as the general ward, skilled nursing facility, inpatient rehabilitation facility, or home, may be challenging with conventional monitoring technology. A system should be comfortable, ideally non-contact, extremely easy to deploy and use, and should be robust to any type of confounding factors that may be experienced in various healthcare settings as well as the home environment. Contactless systems may use radio-frequency technology such as radar. However, radar systems that are affordable and low power may have limited sensing capabilities, and may be limited by the radar architectures that have been available at low cost and low power. Radar systems may be based either on continuous wave doppler radar, or on pulsed (ultrawideband) radar with a time-gating limited single detection zone. Continuous wave Doppler radar may not be able to distinguish between signals recorded at different distances to the device. A bedpartner (home setting) or other patients/caretakers in the room (healthcare setting) may thus interfere and avoid accurate monitoring Pulsed radar systems that use time-gating in hardware to limit the detection zone may only detect a user when they are in a predefined range. When a second person is within the detection zone (common in a bedpartner scenario), the sensor may once again not distinguish between both users, making accurate monitoring difficult. With an inability to determine user range, systems may not be able to provide behavioral analysis, such as the time spent in bed, time spent in other parts of the room, movement and activity throughout the room, bed exits and entries, as well as fall detection. Some systems do not integrate multiple sensor data (user motion, distance, ambient sensors) to provide continuous behavioral, sleep, and health monitoring. Some systems are not easy to deploy and use at home by non-technical users, as they may require daily user interaction (start/stop monitoring), connectivity with a mobile device, and cumbersome setup procedures. The measurement apparatus or device 120 of the vital sign monitoring system 100 overcomes these deficiencies, as described below.

Before continuing, it should be noted that the examples described above are provided for purposes of illustration, and are not intended to be limiting. Other devices and/or device configurations may be utilized to carry out the operations described herein.

Figure 2:
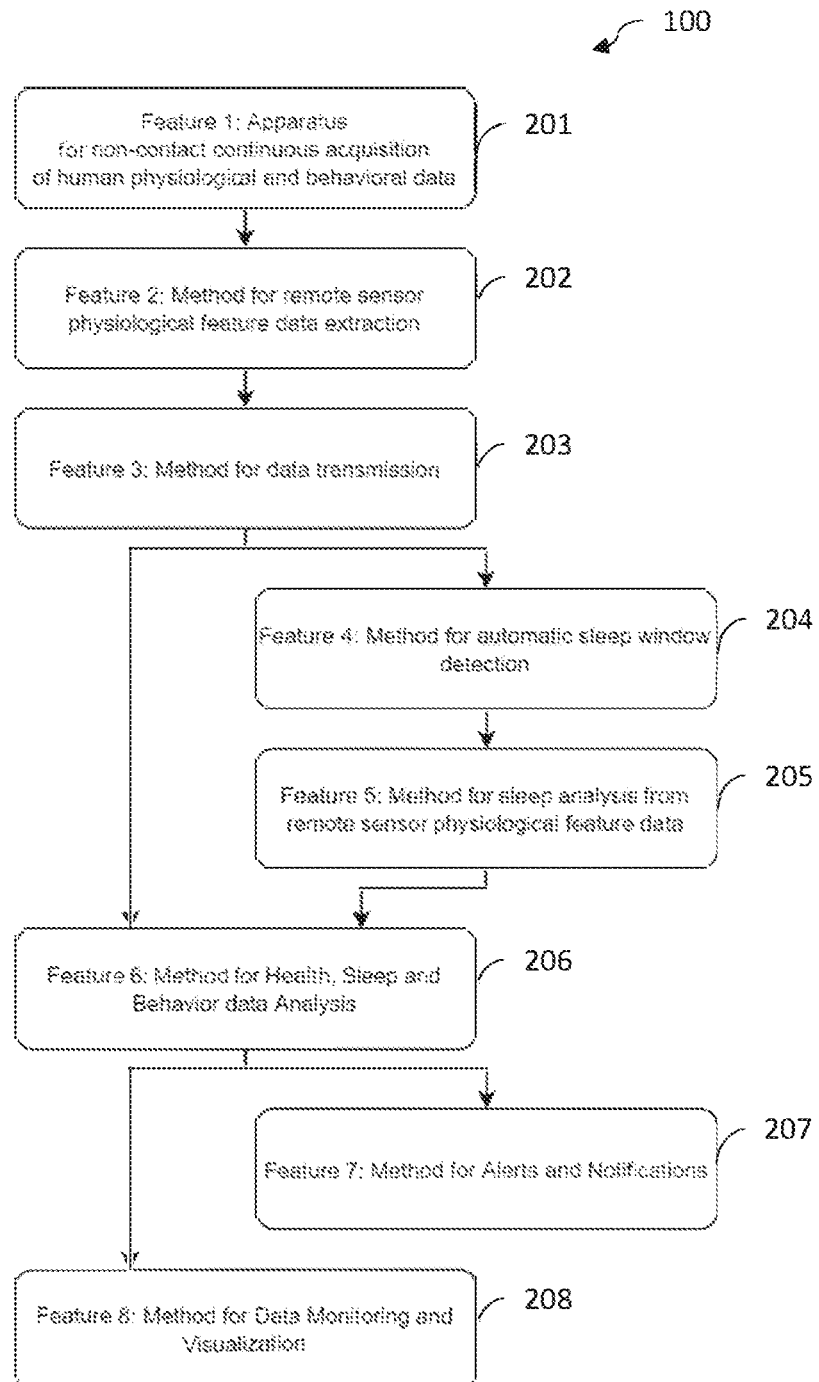
FIG. 2 is an overview, in block diagram form, of features of the vital sign monitoring system and a schematic of the associated workflow, in accordance with at least one embodiment of the present disclosure.

FIG. 2 is an overview, in block diagram form, of features of the vital sign monitoring system 100 and a schematic of the associated workflow, in accordance with at least one embodiment of the present disclosure. Features of the vital sign monitoring system may include the following:

TABLE 1

Overview of Features, and Feature in- and outputs

| Feature | Input | Output |
| --- | --- | --- |
| Feature 1: Apparatus for non-contact continuous acquisition of human physiological and behavioral data | — | Raw data |
| Feature 2: Method for remote sensor physiological feature data extraction | Raw data | Feature data |
| Feature 3: Method for data transmission | Raw data + Feature data | Raw data + Feature data |
| Feature 4: Method for automatic sleep window detection | Raw data + Feature data | Truncated Feature data |
| Feature 5: Method for sleep analysis from remote sensor physiological feature data | Truncated Feature data | Hypnogram + Sleep Metric Data |
| Feature 6: Method for Health, Sleep and Behavior data Analysis | Raw data + Feature data + Hypnogram + Sleep Metric Data | Alerts and Notifications |
| Feature 7: Method for Alerts and Notifications | Alerts and Notifications | — |
| Feature 8: Method for Data Monitoring and Visualization | Raw data + Feature data + Hypnogram + Sleep Metric Data | — |

In FIG. 2, feature 1 is represented by element number 201. Feature 2 is represented by element number 202. Feature 3 is represented by element number 203. Feature 4 is represented by element number 204. Feature 5 is represented by element number 205. Feature 6 is represented by element number 206. Feature 7 is represented by element number 207. Feature 8 is represented by element number 208.

Note that these Features are illustrated in FIG. 2 and tabulated above in Table 1 to, among other things, show an example of the interrelated nature of these Features. FIG. 2 is merely one example, and is not meant to imply that all eight Features must be used together. In accordance with various embodiments, any combination of the features can be used and interrelated in various ways as needed depending on, for example, purpose and need. Moreover, each of the Features described in the above Table 1 and in the example workflow of FIG. 2 can be used in isolation, with no connectivity or interrelatedness to the other Features. In fact, each Feature arguable independently solves a need in the public domain.

Figure 3B:
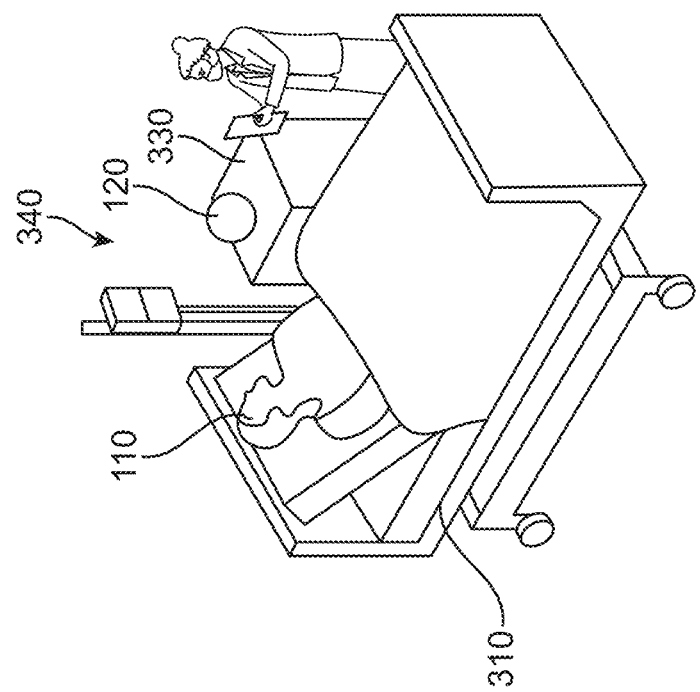
FIG. 3B is a perspective view of the apparatus placed beside the patient bed, in a healthcare setting, in accordance with at least one embodiment of the present disclosure.
Figure 3A:
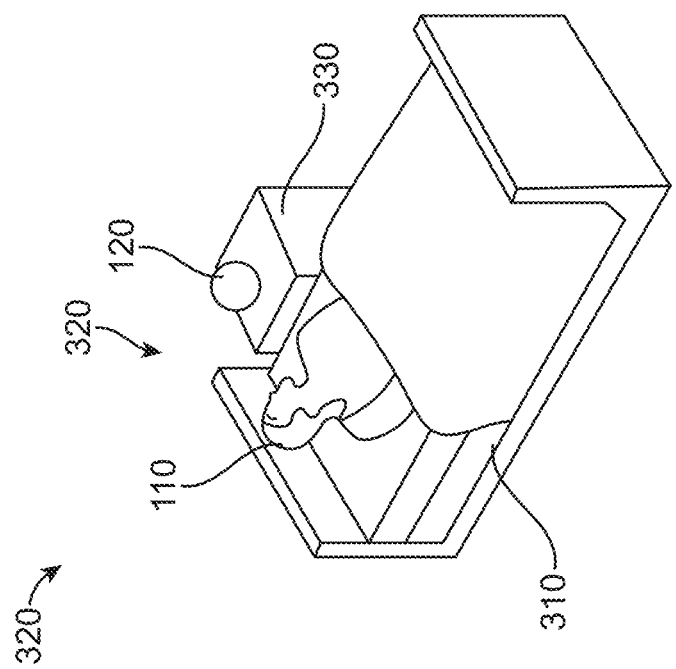
FIG. 3A is a perspective view of the apparatus placed beside the patient bed, in a home setting, in accordance with at least one embodiment of the present disclosure.

FIG. 3A is a perspective view of the measurement apparatus or device 120 (e.g., an implementation of Feature 1 or element 201 of FIG. 2), placed beside the patient bed 310 in a home setting 320, in accordance with at least one embodiment of the present disclosure. The apparatus 120 is intended for continuous, non-contact data collection of a patient 110 in bed or in the vicinity of the apparatus. The apparatus 120 is typically placed beside the user bed 310, ensuring that the patient is in the apparatus detection range. The apparatus 120 is intended for health monitoring, and may be used in a home setting 320 (e.g., for remote patient monitoring by a health care professional). For monitoring of a patient 110 in a bed 310, the apparatus 120 may for example be placed on a nightstand, table, bookshelf, chair, or other furniture 330. The apparatus 120 may also be attached to the bed 310, to a wall or ceiling, or underneath the bed 310. In some embodiments, the apparatus 120 may be integrated within the bed 310. The apparatus 120 may be used to monitor the patient 110 throughout a room or accommodation and may thus be placed anywhere in a living or care facility. Multiple instances of the apparatus 120 may be used to monitor a patient 110 as they move around a living space or healthcare facility.

The following features of the measurement apparatus or device 120 may be present, and may contribute to its role in the vital sign monitoring system 100. The apparatus 120 may include a contactless sensor which is un-obtrusive and can be used to collect data continuously (e.g., 24 hours per day, 7 days per week) from the patient 110 without disturbing the patient. The apparatus 120 may be configured to continuously monitor vital signs such as respiration rate and heart rate. The type of sensor employed in the apparatus 120 may be able to distinguish between signals measured at different distances to the apparatus 120. Thus, noise sources such as a roommate, other patients on a ward, nurses, hospital equipment, etc. can be excluded from analysis based on their locations, such that only data from the patient 110 is considered. Therefore, the behavior of the patient 110 can be assessed by their position, such as moving around the room, being in bed or not, exiting the bed, and falling.

FIG. 3B is a perspective view of the measurement apparatus or device 120, placed beside the patient bed 310 in a healthcare setting 340, in accordance with at least one embodiment of the present disclosure. The apparatus 120 is typically placed beside the bed 310 of the patient 110 on a piece of furniture 330, ensuring that the patient 110 is within the detection range of the apparatus 120. The 120 apparatus may be used in a healthcare facility 340 (e.g., hospital, skilled nursing facility, rehabilitation center, care home, etc.).

FIG. 4A is a perspective view of the apparatus 120 (e.g., Feature 1 of FIG. 2), in accordance with at least one embodiment of the present disclosure. The apparatus 120 may include a protective casing, containing a printed circuit board (PCB). The PCB may include sensor components, processing components, storage components, communication components, actuator components, and/or power supply components. A magnetic connector may be used to connect the main body of the apparatus to a stand or mounting mechanism. A mounting mechanism may be connected to the wall, to the bed, to other healthcare equipment, or other furniture.

A processor may comprise any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EE-PROM), magnetic or electronic random access memory (RAM), flash memory, disk or tape drive, or other related memory types.

Communication (including but not limited to software updates, firmware updates, or readings from the device) to and from the apparatus could be accomplished using any suitable wireless or wired communication technology, such as a cable interface such as a USB, micro USB, Lightning, or FireWire interface. Bluetooth. Wi-Fi, ZigBee, Li-Fi, or cellular data connections such as 2G/GSM. 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing Status variables and other information.

Communication, if any, within or between the components of the apparatus may be through numerous methods or protocols. Serial communication protocols may include but are not limited to SPI, I²C. RS-232, RS-485. CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or other appropriate subsystem.

FIG. 4B is a perspective, exploded view of the apparatus 120, in accordance with at least one embodiment of the present disclosure. In the example shown in FIG. 4B, the apparatus 120 includes a stand 410, gimbal 420 (e.g., a magnetic gimbal), rear case 440, printed circuit board 450, sensor 455, battery 460, and front case 470.

Depending on the implementation, the apparatus 120 may contain multiple sensors 455 to fulfill the following exemplary functions:

Determine user presence in the detection range of the apparatus

Determine the range of the user to the apparatus

Monitor user respiration and respiratory events

Monitor user heart activity

Monitor user levels of motion

Monitor ambient/environmental light and sound

Register user input such as button presses

Exemplary details on the various sensors 455 are listed below.

The apparatus 120 may employ a remote sensing modality to determine the presence, distance, and movement of the user. Respiration and heart activity can be monitored through motion sensing. For example, respiration and the heart beat may cause a displacement in the chest and abdomen, of a few millimeters and sub-millimeter, respectively. In addition, the heart beat can cause pulsatile motion in the limbs (e.g., the cardioballistic effect). The location-aware motion sensing modality may be radiofrequency based, such as a radar system. In that case, the sensor 455 may include a transceiver, at least one transmitting antenna, and at least one receiving antenna. Different types of radar architectures may be employed. For example, a coherent ultrawideband radar may be used. Alternatively, a pulsed radar architecture may be used, or a stepped-frequency continuous-wave radar (SFCW), or a frequency-modulated continuous-wave radar (FMCW).

In one embodiment, the radar sensor 455 operates in the ultra-wideband frequency band (3.1 to 10.6 GHZ), below the part 15 limit of −41.3 dBM/MHz, which enables unlicensed use. The corresponding wavelength of a center frequency between 3.1 and 10.6 GHz may provide relatively high sensitivity of respiration-induced chest displacement. Alternatively, the radar system may operate in the automotive short-range radar band (76 to 81 GHZ) or in the ISM bands of 24 GHZ or 122 GHz. Radar frames may be obtained at a rate that is sufficient to accurately capture motion and respiration, as well as for estimating heart rate. In one embodiment, this frame rate may be between 10 and 30 frames per second. Alternatively, different framerates may be considered, ranging between 1 and 500 frames per second.

In a particular non-limiting embodiment, a detection range of 0.3-3.2 m may be employed to allow monitoring in and near the patient bed, although other ranges both larger and smaller may be used instead or in addition. Alternatively, a larger detection range may be set to allow monitoring of a larger living area. Detection range may be user defined through software, to customize the system to an individual patient's needs. A radar architecture with the ability to sample the entire detection range may be used (as opposed to a time-gated architecture limited to a single measurement range), so that a patient can be monitored at a plurality of different distances to the apparatus. In addition, multiple users may be monitored simultaneously, separating them in down-range. Thus, a patient and bed partner can be monitored in a home setting, or multiple beds can be monitored in a hospital ward or care home setting.

A single, monostatic radar system 455 may be used. Alternatively, a multistatic radar system may be used, employing more than one receiving antenna and/or more than one transmitting antenna. To obtain spatially diverse data in the multistatic radar case, either a single transceiver system may be used in combination with a switch matrix, or multiple transceivers may be used without the need of a switch matrix. In case of multistatic radar data, standard beamforming techniques may be used to adaptively optimize gain in the direction of the patient and to spatially filter out competing noise sources (e.g., moving objects or persons) in the vicinity of the device. If a multistatic radar system is used along with beamforming, monitoring of multiple persons may be aided by constructing an individual beamformer for each person, according to beamforming theory. By using spatial filtering, multiple users can thus be monitored, separating them in cross-range. If a multistatic radar system is used along with beamforming, separate monitoring of a single user's abdomen and thorax may be performed, e.g., when the apparatus is placed beside the bed of the patient. A thoracic and abdominal sensing beam may be computed (e.g., by a beamformer) according to beamforming theory. Separate monitoring of abdominal and thoracic respiration-induced displacement may be of relevance for detecting breathing patterns associated with REM sleep, stress, and paradoxical breathing.

Instead of a radiofrequency based remote sensing modality, the motion and range monitoring functionality may be achieved though alternative remote sensors 455. An ultrasound based sensor 455 may be used, or an optical sensor 455 (video, infrared, laser), or a capacitive sensor 455. Alternatively, a semi-contact sensor 455 such as an accelerometer or pressure sensor may be used when the apparatus 120 is connected to the bed or mattress of the patient. In this case, presence, motion (and derived respiration and heart activity) can be obtained, but user distance to the apparatus cannot be determined when the user is out of bed. More details on the method to derive user presence, distance, movement, respiration, and heart activity from remote sensor data is provided in Feature 2: Method for remote sensor physiological feature data extraction.

In some embodiments, the apparatus 120 may employs ambient or environmental sensors 455. A light sensor 455 (e.g., a red-green-blue or RGB light sensor) may be used to measure light levels in the room. A microphone 455 may be used to measure ambient noise levels in the room. Additional ambient sensors 455 may include a temperature sensor, humidity sensor, or air quality sensor. Ambient sensor data may be used to analyze user behavior, estimate sleep behavior, and analyze bedroom quality. Further details on sleep behavior analysis are given in Feature 4: Method for automatic sleep window detection. An apparatus microphone 455 may be used to record audio data, which may be further processed for respiratory analysis, in conjunction with remote sensor (radar) respiration data. More details on this method is provided in Feature 2: Method for remote sensor physiological feature data extraction. A thermographic camera 455 may be employed by the apparatus 120 to collect nocturnal video data of a sleeping patient, or to determine body temperature of the patient.

The apparatus 120 may include buttons 456 to register user input. Alternatively, other sensors 455 may be used, such as a capacitive touch sensor. The apparatus 120 may also include a speaker 458 to provide user feedback, through sounds and/or spoken word. The combination of speaker and microphone may be used in combination with voice assistant technology. The voice assistant in this case may be used specifically for telemedicine purposes, such as performing a symptom check, or for reminding a patient of their prescribed therapy or intervention. The speaker and microphone may also be used for direct communication with healthcare professionals or caregivers.

The apparatus 120 may include indicator lights 454 (e.g., RGB LED indicator lights), that may, for example, be organized in a circular arrangement on the front of the device Other arrangements or locations may be used instead or in addition. Indicator lights 454 may for example inform the user of connectivity status, power status, mode (configuration or monitoring), etc. Indicator lights 454 may also be used to provide feedback to users on specific functions of the overall system. For example, when the user triggers a spot measurement of respiratory rate, indicator lights may indicate once a spot measurement has been completed (details on respiratory rate monitoring in Feature 2: Method for remote sensor physiological feature data extraction) For sleep monitoring functionality, indicator lights 454 may indicate the start and end of a sleep session, as well as provide feedback on the sleep quality after a sleep session has been analyzed (details on sleep monitoring in Feature 5: Method for sleep analysis from remote sensor physiological feature data). The intensity or brightness of the indicator lights 454, or number of activated indicator lights 454, may be adaptive to the ambient light levels, such that LEDs on the apparatus do not disturb a user in low light conditions (during sleep), but are visible during the day. In an example, indicator lights 454 on the apparatus 120 may be disabled by the user by a press of the button on the device.

FIG. 4C is a perspective view illustrating the apparatus 120 with magnetic connection to a stand 410, in accordance with at least one embodiment of the present disclosure. In the example shown in FIG. 4C, the apparatus 120 includes a case 430, button 480, stand 410, magnetic gimbal 430, magnetic attachment point 490, a cable 494 terminating in a connector 496, and a cable connection socket 498. In an example, the cable 494 passes through a through-hole 492 in the stand 410, although other arrangements may be used instead or in addition. In an example, the magnetic gimbal provides a magnetic attachment to the magnetic attachment point 490, although other attachment methods between the case 430 and the stand 410 may be used instead or in addition.

In an example, the apparatus 120 is powered by a power supply cable 120, connected to a power source. The apparatus 120 may also have a built-in battery, to facilitate device functioning for limited duration without the need for a power cable. The apparatus 120 may also have internal memory for limited data storage, in case an interruption of data transmission occurs. The apparatus 120 may also have an internal clock with accompanying battery to be time-aware during absence of internet connectivity.

The apparatus multimodal sensor data may be collected continuously (e.g., 24/7). Physiological feature data are extracted locally on the apparatus using embedded algorithms. Raw and/or processed data are transmitted to a remote processing unit or to remote storage. Alternatively, data may be stored locally on the apparatus 120 (e.g., for limited recording time), for monitoring scenarios where apparatus communication with a remote server is not possible.

FIG. 4D is a perspective view illustrating magnetic connection of the apparatus 120 to a wall mount 415, in accordance with at least one embodiment of the present disclosure. In the example shown in FIG. 4D, the magnetic attachment point 490 of the case 430 attaches to a magnetic gimbal 425 connected to a wall mount 415, which attaches to a wall 412 (whether removably or otherwise) by means of a fastener 418 (e.g., a screw, bolt, rivet, drywall anchor, etc.). In addition, the cable connector 496 connects with the connection port 498 by means of a right-angle adapter 497. Other types of adapters may be used instead or in addition.

Figure 5:
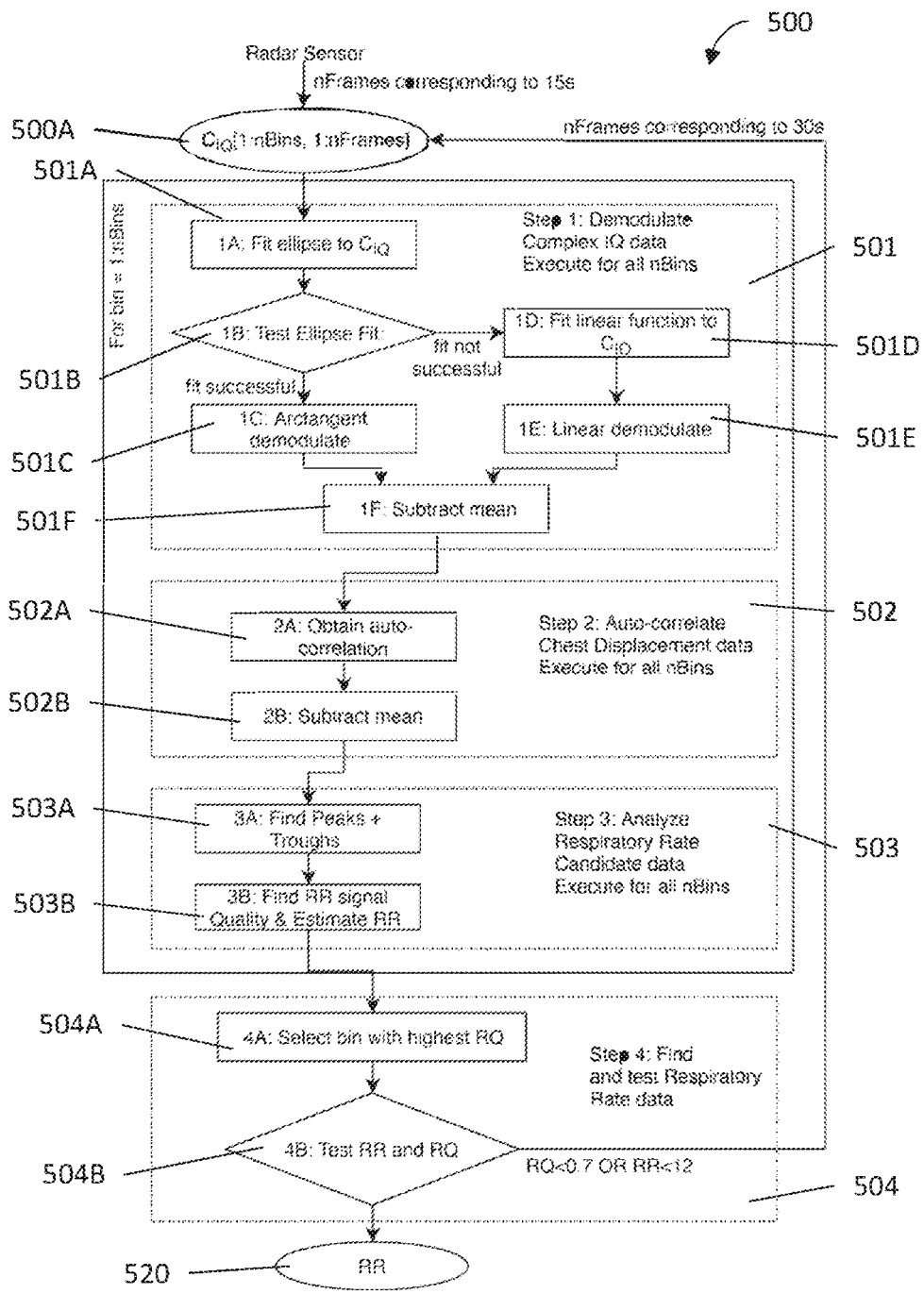
FIG. 5 is an illustration, in block diagram form, of an example respiratory rate extraction algorithm, in accordance with at least one embodiment of the present disclosure.

FIG. 5 is an illustration, in block diagram form, of an example respiratory rate extraction algorithm 500 (Feature 2), in accordance with at least one embodiment of the present disclosure. The block diagram indicates input and output data, as well as the different steps that comprise the method of respiratory rate estimation. In this example, the algorithm is able to determine both Respiratory Quality (RQ) and Respiratory Rate (RR).

The algorithm or method 500 includes a first step 501 to demodulate complex in-phase (I) and out-of-phase quadrature (Q) data, a second step 502 to auto-correlate chest displacement data for all n bins, a third step 503 to analyze respiratory rate candidate data for all n bins, and a fourth step 504 to r-find and test respiratory rate data.

In step 500A a processor implementing the method receives n frames of radar data corresponding to a measurement period (e.g., 15 seconds) of complex in-phase (I) and out-of-phase quadrature (Q) data. Respiratory rate can be obtained from radar sensor data. Phase variations of received electromagnetic reflections may be detected to track mechanical displacement of the chest and abdomen. Down conversion of a received radio frequency (RF) signal may be employed for phase detection. Down conversion may happen in the analog or in the digital domain, and may involve mixing the received signal with the carrier frequency to obtain complex in-phase (I) and out-of-phase quadrature (Q) data.

In step 501A the processor fits an ellipse to the complex IQ data.

In step 501B, the processor determines whether the ellipse fit has been successful. If yes, execution proceeds to step 501C. If no, execution proceeds to step 501D.

In step 501C, to obtain phase variations (representing a variation in radar time-of-flight; ToF), arctangent demodulation may be used. Arctangent demodulation assumes that no direct-current (DC) offset is present in the IQ data, and that radar data describes a circle in the complex IQ plane. However, an unknown scatter environment may cause a DC offset in the obtained complex IQ data, invalidating the typical assumptions underlying arctangent demodulation. Execution them proceeds to step 501F.

In step 501D, the processor performs a line fit to the complex IQ data and in step 501F, the processor performs linear demodulation. Linear demodulation of complex IQ data may be used when arctangent demodulation is not appropriate, but may only be valid when ToF variation is small relative to the chosen radar carrier frequency wavelength. The demodulation method and assumptions may be of importance for correct estimation of respiratory rate, but also for obtaining a respiratory waveform that is representative of the user's chest/abdomen displacement. An additional issue is that, when monitoring respiratory rate in a real-world environment, artifacts may occur due to user motion. Motion artifacts may appear as a respiration signal and may cause false readings of respiratory rate. However, a robust algorithm may distinguish respiratory rate from noise and artifacts.

Some radar-based breathing frequency monitors may sample radar data at only a single range. This range may be either unknown (continuous wave radar), or at a single, predetermined limited range (time-gated pulsed radar). This may limit the functionality of the radar system that may not be able to distinguish between targets at different distances to the sensor. Some radar systems do not offer the functionality of dynamically selecting the best range for estimating respiratory rate and extracting the respiratory waveform. A radar system that samples a plurality of distances within detection range and can thus measure at a set of isolated distances from the sensor, may employ an algorithm that is able to detect the 'best' respiration signal in the detection zone.

Some radar-based breathing frequency monitors may only output the extracted respiratory rate and may not provide a respiratory waveform, as a continuous measure of chest displacement. The reason for this may be that arctangent demodulation is used, which does not necessarily provide a true measure of chest displacement. For arctangent demodulation. DC may be estimated, which is often not possible when user respiratory motion (chest expansion) does not occur along the radial direction (due to user aspect angle). The vital sign monitoring system of the present disclosure may include a method to dynamically determine the most valid demodulation approach (arctangent or linear), in order to provide an accurate measure of chest displacement. A dynamic approach may be more robust than a fixed demodulation method, as user position and orientation relative to the sensor may vary during long-term monitoring.

Where single-range sampling is employed in some radar-based respiration monitors, no range-measurement may be provided. However, user range is valuable for determining whether a user is in bed or not, as well as for positioning applications. The vital sign monitoring system of the present disclosure may therefore include range detection of the user.

The vital sign monitoring system may comprise a method to 1) dynamically choose the most appropriate demodulation method of complex IQ data. 2) determine whether the demodulated waveform contain a valid respiration signal. 3) determine respiratory rate (RR) from the demodulated time series in a robust manner, as well as other respiratory features 4) obtain a quantitative metric for motion, and 5) determine the range of the user based on respiration and movement data. The method can be applied to complex IQ data, which can be either obtained at a single range (using a continuous wave doppler radar architecture or time-gated pulsed radar), or using a coherent UWB radar architecture sampled across a plurality of distances within the detection range. In the first case, a single IQ time series may be obtained from the radar system. In case of the latter, parallel sampling of received radar signals at different ranges may be performed, thus obtaining multiple IQ time series, corresponding to different distances from the sensor. Parts of the method may also be applied to raw radar data without the use of complex IQ conversion. In the example shown in FIG. 5, a measure for ToF variation is obtained from complex IQ data in the following manner. However, it is noted that similar results could be achieved without that conversion step, and once could still apply certain steps of the method without using complex IQ data.

Complex IQ data time-series are obtained within a sliding analysis window. An analysis window length of, for example, 5-25 seconds may be suitable, as respiration may be assumed stationary. Analysis window lengths ranging from 10 to 60 seconds may be considered, depending on available processing memory and user population. To accurately detect RR at low breathing rates (e.g., less than 10-15 breaths per minute), an adaptive analysis window length may be applied, as detailed below. An ellipse is fitted to complex IQ data in the selected window, for each of the time-series, collected at each of the plurality of distances.

Using ellipse fit parameters, the elliptical complex IQ data is translated, rotated, and transformed, in order for the data to lie on a unit circle around the origin.

The goodness of fit is evaluated. If the data is judged to lie on the unit circle, and its unwrapped arc does not exceed pi, arctangent demodulation is deemed appropriate. Data are judged to lie on the unit circle if both of the following criteria are met: (1) The mean squared absolute difference between radius of the test data and 1.0 (unit circle) does not exceed 0.05, and (2) All test data lie within an inner circle with radius of 0.5 and an outer circle with radius of 2.0. Depending on the implementation, other criteria may be used instead or in addition. If arctangent demodulation is deemed appropriate, a metric for ToF variation is obtained as the angle variation of the transformed complex IQ data.

In case the transformed data does not describe an arc on the unit circle and arctangent demodulation is not deemed appropriate, linear demodulation is applied instead of arctangent demodulation. In this case, a line is fitted to data in the complex IQ plane, and its angle to the x-axis is determined. Next, all data is rotated to lie along the y-axis. A metric for ToF variation is now obtained as variation along the y-axis.

From the ToF variation data, respiratory rate may for example be obtained using an autocorrelation approach, which rejects motion artefacts and other non-respiration signals. However, the autocorrelation approach is only one way of achieving the following: 1. Determine whether the signal is a valid respiration signal, and 2. Determine the respiratory rate. Alternative methods could be used, instead or in addition, to achieve this goal. If multiple ToF variation time series recorded at a plurality of distances, are available (when using coherent UWB radar), the methods as detailed below may be applied to each of the range bin time series (e.g., time series at each distance of the plurality of distances) independently.

In step 501F, the mean is subtracted from the time series signal.

In step 502A, after subtraction of the mean, the autocorrelation of the ToF variation time series is obtained. Only the first half (negative lags) of the autocorrelation signal is considered.

In step 502B, the mean is subtracted from the autocorrelation signal.

In step 503A, all local peaks and troughs of the autocorrelation signal are identified.

In step 503B, the intervals between all adjacent peaks and troughs are obtained. The intervals between peaks and troughs reflect the signal periodicity and are therefore inversely related to RR. In order for the ToF variation data to be considered containing a valid periodic signal, the following conditions should be met: (1) Each interval should not be smaller than an interval corresponding to the upper detectable RR range, and should not be greater than an interval corresponding to the lower detectable RR range. The detectable RR range should cover the range of physiological RR values expected in the target population, or at least the range which is clinically relevant to detect. A range of 5-70 breaths per minute is suitable for the adult population. (2) All peaks should be above 0), and all troughs should be below 0. If these conditions are met, RR is estimated from the average interval between all peaks and troughs. If any of the conditions fail, no RR is obtained from the current time series.

To obtain a quality metric of the respiratory signal in the considered time series and exclude time series containing movement artefacts and noise, the following method is performed: (1) A linear function is fitted both to the troughs and to the peaks in the autocorrelation signal. (2) The mean normalized error of both fits is obtained. A final quality metric is defined as a combination of both the normalized error values (of peaks fit and troughs fit):

$$\text{quality} = e^{-\text{mean\_error\_peaks}} * e^{-\text{mean\_error\_throughs}}$$

Again, this is merely one exemplary set of rules to judge whether the signal meets the criteria for valid respiratory rate. Alternative rules could be used instead or in addition.

In an example, if RR below 10-15 breaths per minute is detected, the above method is repeated using a longer analysis window length of, e.g., 30 seconds. Thus, a quality metric and an estimate for RR is obtained. If a single time series is available (such as in CW Doppler radar), the respiratory waveform is considered valid, and the value for RR is outputted if the quality metric exceeds a predetermined threshold.

If coherent UWB radar is used and multiple time series are available at the plurality of distances or sampling ranges, the RR value corresponding to the highest quality metric is selected. If the quality metric exceeds a certain predetermined threshold, the respiratory waveform is considered valid, and the RR value is outputted.

If no RR value is outputted due to low quality metric, data in the relevant window is considered noise and the initial RR estimate is deemed unreliable. No value for RR or respiratory waveform are being outputted.

In an example, a quality metric threshold of 0.7 was found to be effective in distinguishing between valid respiration and artefactual data.

When applying the method to coherent UWB radar, the selected time series containing the valid RR signal, corresponding to a certain radar range, may be used to obtain an estimate of the range of the user (User RR Range), by converting absolute ToF to distance:

$$\text{distance} = ToF * \text{speed of light}/2.0$$

In step 504A, to account for multi-path scattering, the processor selects the radar bin or frame with the highest respiratory quality metric RQ.

In step 504B, the processor tests RR and RQ. In an example, if RQ indicates low respiratory quality or RR indicates low respiration rate, execution returns to step 500A Otherwise, execution proceeds to step 520, where the obtained value of RR is used at the patient's respiration rate.

User RR Range may also be estimated from the time series corresponding to the nearest user range which shows similarity to the time series that was identified as containing the RR signal with highest quality metric RQ. In one embodiment, this signal similarity may be assessed by performing correlation, with an example threshold of 0.8 to distinguish between signals that correlate and signals that do not correlate. However, alternative methods could be used instead or in addition to determine the same result.

Respiratory Waveform

If valid respiratory waveform data were obtained, the waveform data are further used to derive multiple respiratory features. In an example, each respiratory waveform is 15-30 seconds in duration, has arbitrary polarity, and shows overlap with adjacent respiratory waveforms due to the sliding window analysis. The following processing steps are applied:

The overlapping section of each pair of subsequent respiratory waveforms are identified and their correlation is obtained. If negative correlation is observed, the polarity of the second waveform is inverted (the signal is flipped about the horizontal axis).

Each respiratory waveform RMS (root mean square) is normalized to an arbitrary fixed value.

Within a time window (e.g., 30 seconds), the sum of the derivatives of subsequent, partially overlapping waveforms is obtained, for each sample. The number of waveforms that are summed for each sample may differ, and depends on the number of valid respiratory waveforms that was obtained and how much they overlap.

Each sample in the summed derivative signal is now divided by the number of waveforms that overlapped in the considered sample. This produces an average derivative waveform, composed of a variable number of overlapping waveform sections.

A cumulative sum is obtained to reconstruct the final 30-second waveform, composed of multiple partially overlapping shorter waveforms.

A different window length than 30 s may be used: 60 s for example may be a reasonable alternative.

The obtained respiratory waveform is detrended and bandpass filtered to a band surrounding the range of detected values for RR in the considered time window (e.g., 30 seconds).

The polarity of the resulting smoothed waveform is determined, and set such that the end of inhalation corresponds to the waveform peak: (1) The mean duration of the presumed inspiratory and expiratory sections of the waveform are determined from the signal derivative: the derivative values above zero are assumed to be inspiratory sections, whereas the derivative values below zero are assumed to be expiratory. (2) If the duration of the presumed inspiratory section exceeds the duration of the presumed expiratory section, the polarity of the respiratory waveform is judged to be wrong, and is flipped about the horizontal axis. The polarity that is chosen to represent the signal is arbitrary and the opposite polarity may be used in an alternative embodiment.

Individual breath segments are identified. In one embodiment, zero-crossings are used to distinguish between successive breaths. Intervals between each second zero crossing are assumed to correspond to breath-to-breath intervals.

Respiratory Features

The following features are obtained from the obtained respiratory waveform (e.g., a 15-45-second waveform) and its zero-crossings:

Respiratory rate variability (RRV): Defined as the standard deviation of all breath-to-breath intervals, obtained from the intervals between each second (even) zero-crossing.

Maximum absolute difference between consecutive breath intervals (MADI): defined as the maximum absolute difference between consecutive second zero-crossings. This feature describes large irregularities in breath intervals which occur during for example a sigh.

Duration of inspiration: Mean duration of each inspiration, obtained from the duration of the positive sign section of the derivative of the respiratory waveform.

Duration of expiration: Mean duration of each expiration, obtained from the duration of the negative sign section of the derivative of the respiratory waveform.

Ratio of breath duration to breath-to-breath interval, as defined by the half-max points of each individual breath. This metric describes the relative duration of a breath and the presence of inter-breath pauses.

Harmonic content: The magnitude and phase of the first n harmonics (e.g., 5 harmonics) of the respiratory rate frequency, obtained using a Fast-Fourier transform.

Amplitude variation: Standard deviation of amplitudes of individual breaths, providing a measure for amplitude regularity.

Movement Detection

User movement is quantified by considering the amplitude of non-respiration frequency components at different ranges. The following steps are applied to radar data, e.g., every 30 seconds.

Amplitude of frequency components at different distances to the sensor are determined using a Fourier transform (Fast Fourier Transform or similar) of consecutive radar frames in a predetermined window length. A Fourier transform is obtained for each individual time series measured at different ranges. Thus, a range-Doppler map is obtained. Window lengths over which the Fourier transform is performed may vary from 10 to 60 seconds, or multiple window lengths may be used to obtain multiple movement measures with different dynamics.

As the range-Doppler map is obtained continuously through a sliding window, the median range-Doppler map over a longer period of time may be considered a noise floor, containing static reflectors at 0 Hz, as well as a respiration component and harmonics, possibly at different ranges due to multi-path propagation. The median-noise range-Doppler map may be obtained as a median over data collected in the past 5 minutes. A different noise floor window length may be selected, depending on available processing memory and assumed use case. Different summarizing statistics such as the mean may be used as alternatives to the median. The noise floor data updated continuously through a sliding window.

Apart from a median-noise map, a noise-variation range-Doppler map is obtained by determining the median absolute deviation of frequency domain data in the noise floor data window, for each frequency and range bin. Thus, for each frequency and range bin, a median-noise and noise-variation map is obtained, together describing the noise floor.

The latest obtained range-Doppler map (corresponding to the last 10-30 seconds of radar data, depending on chosen analysis window length) is compared to the noise floor using a statistical test. For each range-frequency bin, the most recent value is compared to the noise floor. If the most recent value lies beyond a certain threshold (e.g., 2-4 median-absolute-deviations) from the median noise, the range-bin is counted as containing movement. In other embodiments, a different threshold may be selected.

A single metric of movement is obtained by counting the number of range-frequency bins as a fraction of the total number of range-frequency bins. This number thus depends on the sensor architecture and the chosen analysis window length.

Movement may also be quantified specifically at a distance or range of distances at which user respiration was detected. This way, the movement metric only represents user motion, and not motion of other persons or moving objects in the vicinity. The same methods as described above would apply, only a subset of data corresponding to the desired range would be incorporated in creating a noise floor map and testing presence of motion.

Multiple movement features may be produced using the specified method, by employing different window lengths and different detection ranges.

User Movement Range

An estimate for user range is obtained from the range bin at which the respiration signal was detected (as described above: User RR Range). In addition, the distance of the nearest moving target to the device is monitored, as a respiration-independent estimate of user range: User Movement Range. In an example the radar architecture samples data at 56 different range bins within the detection range of 0.3-3.2 m from the apparatus. Each range bin thus corresponds to about 5.2 cm. User Movement Range is estimated as the nearest range bin in which movement is detected in the recent past (e.g., the past 2-5 seconds). The following steps are executed on raw radar IQ data.

For each range bin: (1) Find the RMS (root mean square) of raw IQ data in the past 30 seconds. (2) Find the complex variance of raw IQ data in the past 3 seconds. It is noted that for both durations (e.g., 3 and 30 sec), a different value may be chosen. Example range for the short window length: 0.1 s-30 s. Example range for the long window length: 1 s-600 s (3) Calculate the ratio of value obtained in step 1 and 2: Variance/RMS. The vector of ratios, representing movement intensity at a plurality of distances and points in time, may also be transmitted and/or stored, for further analysis of movement patterns. In an alternative embodiment, the here obtained movement intensity is used to quantify overall user movement, instead of or in addition to the maximum absolute difference between consecutive breath intervals (MADI) method described above.

To find User Movement Range, find the nearest bin in the obtained movement intensity vector, for which: log 10(Variance/RMS) is greater than a threshold value (e.g., 2-5).

If none of the range bins' Variance/RMS ratio exceeds the threshold, it is determined that no user is present within the detection range of the apparatus, and 'absence' is outputted.

User Movement Range may for example be computed at an interval such as every second, or another interval between 0.1-30 s.

Heart Rate

In the example of FIG. 5, user heart rate (HR) is obtained in similar fashion to respiratory rate data: The heartbeat causes a small (sub-mm) displacement of the chest, as well as a (delayed) pulsatile motion in various limbs due to the cardio-ballistic effect. Demodulated radar data at a single range bin (as obtained in the Respiratory Rate algorithm section above, or an alternative range bin or plurality of distances) contains heart rate. To obtain heart rate:

The respiration signal should be filtered out. An adaptive filter, based on the obtained respiratory waveform signal, is constructed, to ensure that RR and its harmonics are successfully filtered out.

HR is estimated from frequency analysis of the windows of filtered radar data (e.g., 5-60-second windows).

The initial estimate of HR may be used to adaptively bandpass filter the radar data to the HR frequency, in order to identify individual heart beats.

Heart rate variability (HRV) may be obtained from heart beat-to-beat intervals.

Alternatively, an estimate of HR may be obtained from characteristics of the frequency spectrum of the bandpass filtered signal, such as HR peak kurtosis, and magnitude of HR harmonics relative to HR magnitude.

Method Output

The output of the exemplary respiration and movement algorithm are thus:

Respiratory rate (RR), measured in the number of breaths per minute, computed for example every 3 seconds.

Respiratory waveform data, computed for example every 3 seconds: A time-series as a metric for respiration-induced, mechanical chest/abdomen displacement.

Respiratory features, computed for example every 30 seconds: A set of features describing the respiratory waveform shape.

Movement data, computed for example every 30 seconds: A quantitative measure for the amount of motion detected in the past 30 seconds.

User range data, computed for example every second: The distance to the nearest moving target within the detection range, and/or distance to the nearest valid respiration signal, assumed to be the user distance. In addition, the full movement intensity vector, may be displayed or stored for further analysis.

Heart rate (HR) and Heart rate variability (HRV), computed for example every 3 seconds.

Method Implementation

All described methods may be implemented as embedded algorithms on the apparatus (as described in Feature 1: Apparatus for non-contact continuous acquisition of human physiological and behavioral data). The method may also be applied to radar data obtained using different devices, or different radar architectures. The sub-methods 'Respiratory Waveform' and 'Respiratory Features' may be performed on processed respiratory waveform data as produced by sub-method 'Respiratory Rate'. These sections of the method may thus be implemented on a remote server instead of on the apparatus, if respiratory waveform data is transmitted from the apparatus to the server.

Figure 6:
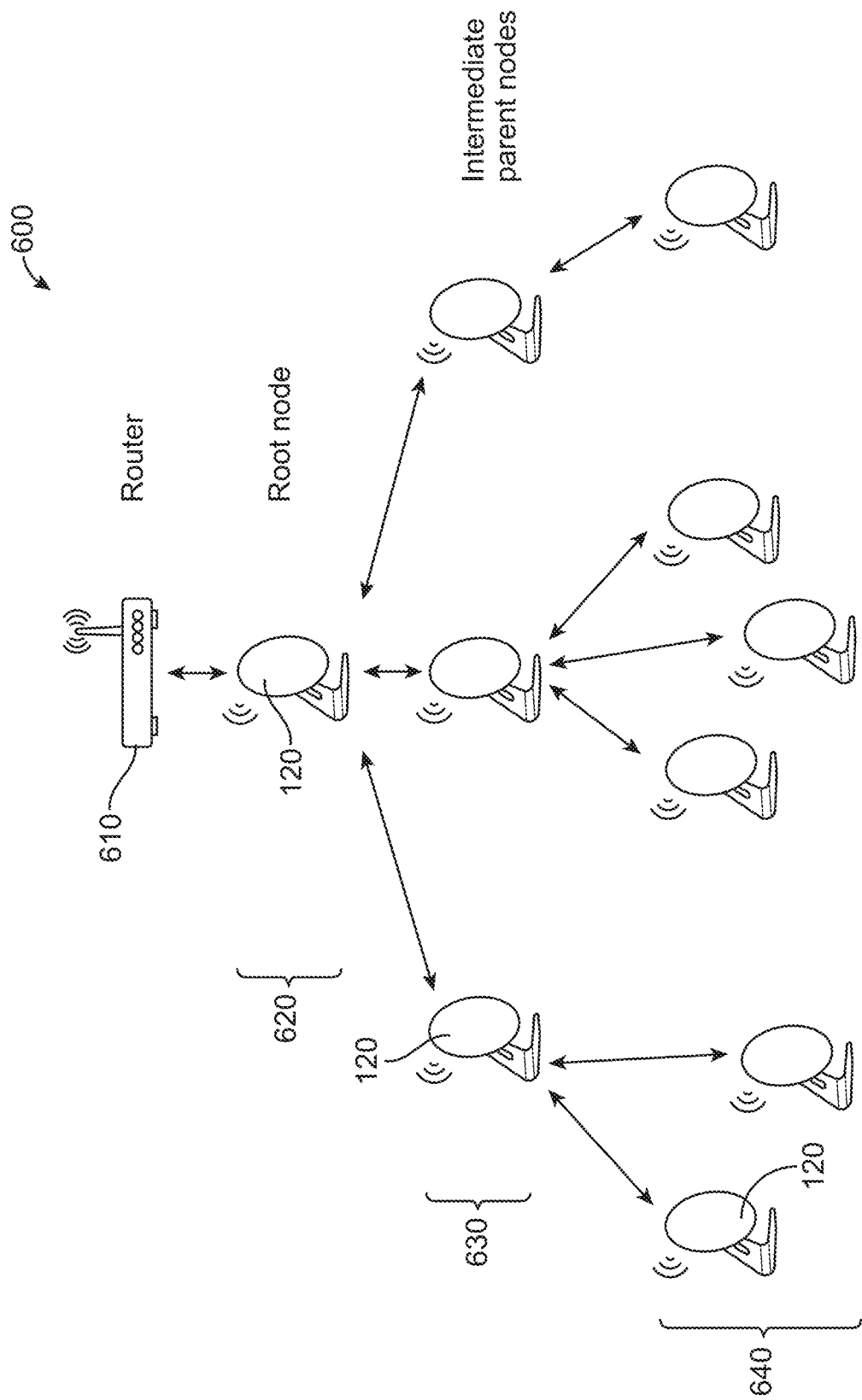
FIG. 6 is a schematic view of an exemplary apparatus connectivity mesh network, in accordance with at least one embodiment of the present disclosure.

FIG. 6 is a schematic view of an exemplary apparatus connectivity mesh network 600 (e.g., an embodiment or implementation of Feature 3, element number 203 of FIG. 2), in accordance with at least one embodiment of the present disclosure. In the example shown in FIG. 6, the mesh network 600 includes a router 610 in wireless communication with at least one root node 620, which may for example be a measurement device or apparatus 120 as described above. Each root node may be in wireless communication with one or more intermediate parent nodes 630, which may also be measurement device or apparatuses 120. In some cases, the intermediate parent nodes 630 may be outside the reliable communication range of the router 610, but may form a mesh network connection to the router 610 via the root node 620. Each of the intermediate parent nodes 630 may be in wireless communication with one or more child nodes 640, which may also be measurement devices or apparatuses 120 as described above. In some cases, the child nodes 640 may be outside the reliable communication range of both the router 610 and the root node 620, but may form a mesh network link with the router 610 through the mesh network comprising the root node 620 and the intermediate parent nodes 630.

In some cases, one or more intermediate parent nodes 630 may not be in communication with any child nodes 640. In such cases, the intermediate parent nodes 630 may be treated as or considered to be child nodes 640. As will be understood by a person of ordinary skill in the art, the mesh network 600 may include more or fewer layers than the four layers shown in FIG. 6, including but not limited to three layers, five layers, six layers, or more.

As healthcare professionals increasingly rely on continuous patient monitoring, it becomes problematic that many healthcare institutions (e.g., skilled nursing facilities), do not have a connectivity infrastructure such as facility-wide Wi-Fi coverage. This may complicate deployment of medical monitoring technologies. Additionally, for remote patient monitoring, installation of devices is complicated by the fact that not all potential users (often elderly patients) have Wi-Fi or a smartphone, and often are not skilled to configure a device to a local network.

Continuous monitoring technologies and alerting systems may rely on continuous data transmission. Connectivity of medical devices may be achieved using Wi-Fi, or direct connectivity to a 'hub' device or router 610. Consumer devices as well as medical devices intended for the home environment often rely on Wi-Fi, or connect to the user mobile phone, e.g. via Bluetooth. Many vital sign monitoring solutions assume wide and reliable Wi-Fi network coverage, and a level of technological know-how of the user. This makes current solutions unsuitable for deployment in many homes or healthcare facilities.

In an example, data obtained or generated by the vital sign monitoring system may be transmitted from the apparatus to a remote server for data processing and/or storage. Raw sensor data, as well as data processed on the apparatus by embedded algorithms (as described in FIG. 2. Feature 2: Method for remote sensor physiological feature data extraction), may be transmitted. Data may be transmitted by connection to a local Wi-Fi network. Each individual apparatus may be connected to a router with active internet connection through Wi-Fi directly. Alternatively, when multiple instances of the apparatus are installed in the same facility, and Wi-Fi coverage is limited, a mesh network 600 may be created, as described above.

In an example, each device 120 can connect to a Wi-Fi access point directly. If such a connection is not possible or not successful, two or more devices 120 may form a mesh network 600 allowing peer to peer communication. In this configuration, a single apparatus 120 may function as the root node 620 and be connected to a Wi-Fi access point (e.g., a router 610). All other devices 120 in the mesh network may act as intermediate parent nodes, and may for example connect to up to 10 other devices. The mesh network of apparatus connectivity allows monitoring of patients outside of a Wi-Fi access point coverage. In addition, this newly created mesh network 600 can be used as an interface for other medical monitoring instruments that wouldn't otherwise be deployable due to a lack of infrastructure.

Data may also be transmitted to a remote server by connection to cellular networks. This solution is particularly suitable for deployment at a patient's home, and may not require any device configuration by the patient. Data may also be transmitted directly to a local device such as computer, tablet, or mobile phone, using either cable or wireless connectivity. When the vital sign monitoring system is transmitting data to a local device, data storage and processing may be performed on the local device, or raw data may be transmitted further to a remote server. Data may also be transmitted by all previously mentioned means to a local 'hub' or router 610, collecting data of multiple devices simultaneously, after which data can be transmitted to a remote server or other digital environment. The apparatus 120 may also act as such a local hub, and collect data from nearby medical devices simultaneously, after which data can be transmitted from the apparatus to a remote server or digital environment. In some embodiments, the apparatus contains internal memory to temporarily store data on the device, in case of a temporary loss of data transmission.

Feature 4: Method for automatic sleep window detection from multiple sensor data Contactless 'nearable' sensing systems such as an optical sensor, pressure sensors or radar-based sensors can be used to monitor sleep from continuous tracking of user physiological sign such as movement, respiration and heart rate. Nearable devices' detection zone can be limited to the user's bed, and are therefore more accurate in determining user intent to sleep than wearable devices. A wrist worn activity tracker will often mistake a user watching tv on the couch as them being asleep. The nearable sensing apparatus may either be attached to the bed or placed near the bed of the user, and physiological data such as body motion, respiration and heart rate are being recorded throughout the night. A classification model may then be run (either on a local processor, on a mobile device, or on a remote server) to predict the sleep state of the user (Wake/REM/Light/Deep) from physiological data. Clinically relevant sleep quality metrics such as the 'time spent awake', or 'time it took to fall asleep', can subsequently be calculated. Such sleep quality metrics may for example provide insights into the severity of insomnia of the user.

Determining the user's intent to sleep (which can be useful for estimating sleep quality metrics correctly) remains a challenge. Bed time and rise time, together defining the 'sleep window', should be obtained. The sleep window cannot simply be determined from the presence in bed alone, as people use their bed for activities such as reading, watching tv, and sex.

For sleep monitoring applications (using wearable or nearable devices), bed time and rise time may be user defined. When using a nearable sensing device in combination with an app running on a mobile-device, one can enter bed time and rise time manually, or use the app to start and stop the monitoring apparatus, thereby defining the sleep window. Alternatively, the monitoring apparatus may have a physical button, which can be used to start and stop the device, thereby defining the sleep window. Some devices attempt to determine the sleep window from user activity data (movement or other metrics of presence in bed), which may sometimes be inaccurate; users will often spend a large portion of time resting (watching tv, reading), before attempting to sleep.

The method employs multi-sensor data to determine the presence of the user in bed and estimate bed time and rise time. Sensor data as described above (Feature 1: Apparatus for non-contact continuous acquisition of human physiological and behavioral data) is employed, as well as processed sensor data (described in Feature 2: Method for remote sensor physiological feature data extraction). The method may also be applied to sensor data obtained through alternative nearable devices, such as devices based on ultrasound technology, optical devices (video, infrared or laser), devices that use pressure or accelerometer data to determine user presence in bed, or mobile/wearable devices. Additional sensor data of external devices may be incorporated. For example, multiple devices present in a smart home environment may be connected via Wi-Fi or Bluetooth to the apparatus, or may be transmitted to a remote server. Sensor data and activity data from the user mobile phone may be employed as well, by transmitting mobile phone sensor data to a remote server.

Apparatus multimodal sensor data is collected continuously (24/7) and transmitted to a remote storage and processing unit. Fromsensor data, user bed time and rise time are estimated daily, and retrospectively. The method is triggered once the user has ended a sleep session and left the bed (more details below).

Algorithm Description

In an exemplary method, the following preprocessing steps are performed:

Presence in Bed is determined from User Range data (Feature 2: Method for remote sensor physiological feature data extraction). Presence in Bed is set to True if the user range lies within a user-defined detection zone corresponding to the bed.

When the user has a bed partner, the detection zone may be set such that it includes the user location but excludes the partner location.

Presence in Bed data may be smoothed, such that (for example) interruptions in Presence in Bed shorter than 15 seconds are ignored. Additionally, short bouts of presence shorter than e.g., 15 minutes during sections of absence may be ignored.

A sleep window detection algorithm may be executed, after e.g., at least 60 minutes of Presence in Bed have been detected, followed by 60 minutes of absence. Thus, the sleep window detection algorithm nay be executed retrospectively, one hour after the end of a sleep session. In an exemplary method, the following steps are performed: The onset of Presence in Bed is taken as an initial guess of bed time. In a window from 30 minutes before bed time to 30 minutes after bed time, a search is performed for a drop in illumination levels, as measured using the apparatus light sensor. The strongest drop in illumination is detected for example as the minimum of the differential of continuous illumination data: illumination_drop=minimum(differential (illumination)). In an example, if the detected drop in illumination is found to be lower than −5 times the mean absolute illumination during the considered window, the drop in illumination is considered a lights off event: illumination_drop<−5*mean(absolute(illumination)). If a lights-off event is detected, the bed time is updated and set to the time of lights off. If no such event is detected, the initial guess for bed time is maintained. Rise time is estimated as the end of the smoothed Presence in Bed section with a duration of e.g., at least 60 minutes. In other embodiments, other rules may be chosen to define a lights-off event.

Thus, one or multiple sleep windows may be detected in a 24-hour cycle, to which a sleep stage detection algorithm may be applied (described in Feature 5: Method for sleep analysis from remote sensor physiological feature data). Within a 24-hour cycle, the longest uninterrupted block of smoothed Presence in Bed, may be designated as the main sleep window. The main sleep window may also be composed of multiple uninterrupted blocks of smoothed Presence in Bed, in case a sleep session was interrupted by an extended nocturnal bed exit, such as a bathroom break. The main sleep window may be used to derive relevant sleep quality metrics.

Manual Data Input

The bed time and rise time estimation might be inaccurate when a user does not switch lights off when going to bed, when the bed is used for a range of activities other than sleeping, or when the user is bedbound in for example a hospital ward scenario or nursing facility. For this reason, bed time and rise time may be set by a user or by a caretaker in one of the following ways. Bed and or rise time may be set by pushing a button on the apparatus. Bed and or rise time may be set through interaction with an accompanying app or web portal. Bed and or rise time may be scheduled.

Sensor Data Integration

Apart from data coming from the illumination sensor built in to the apparatus, sensors from other connected devices may be used to improve 'bed time' and ' rise time' estimation. Internet-of-Things (IoT) connected devices such as television, music systems, lamps, thermostat, windows blinds, may be employed. Also, mobile phone usage data may be employed to improve 'bed time' and 'rise time' estimates. For all cases, a continuous block of Presence in Bed may be used to estimate bed and rise time initially, and connected devices data may be used to predict bed and rise time more accurately. For example, a designated IoT night lamp may be set to define bed time, whereas a bed exit directly preceding activation of an IoT coffee-maker may define rise time.

Model Personalization

The bed time and rise time estimation algorithm, and in particular the thresholds used, may be personalized after multiple days of use. A user may be asked to manually set timestamp at 'bed time' and at 'rise time'. Timestamps may be set through a button press on the apparatus, through a voice assistant, through a button press on the accompanying app, or may be entered retrospectively through either a mobile or web-based interface. Based on all available continuous sensor data, a personalized model may be constructed which predicts when bed time and rise time events were most likely to occur. The punctate bed time or rise time event may be smoothed by convolution with a gaussian to reduce the required amount of training data. A multiple linear regression model, incorporating sensor data at various time lags (ranging from −10 to 10 minutes, −30 to 30 minutes, −20 to 0 minutes, or other ranges both larger and smaller) may be trained to predict the likelihood of bed time and rise time occurrence. A separate model may be trained to predict bed time and rise time likelihood. After model training on multiple days of data with user defined bed and rise time, the model may be used to automatically predict bed and rise time, selecting the maximum likelihood as the event occurrence. Alternatively, a convolutional neural network or other machine learning approach may be used to achieve the same result.

Figure 7:
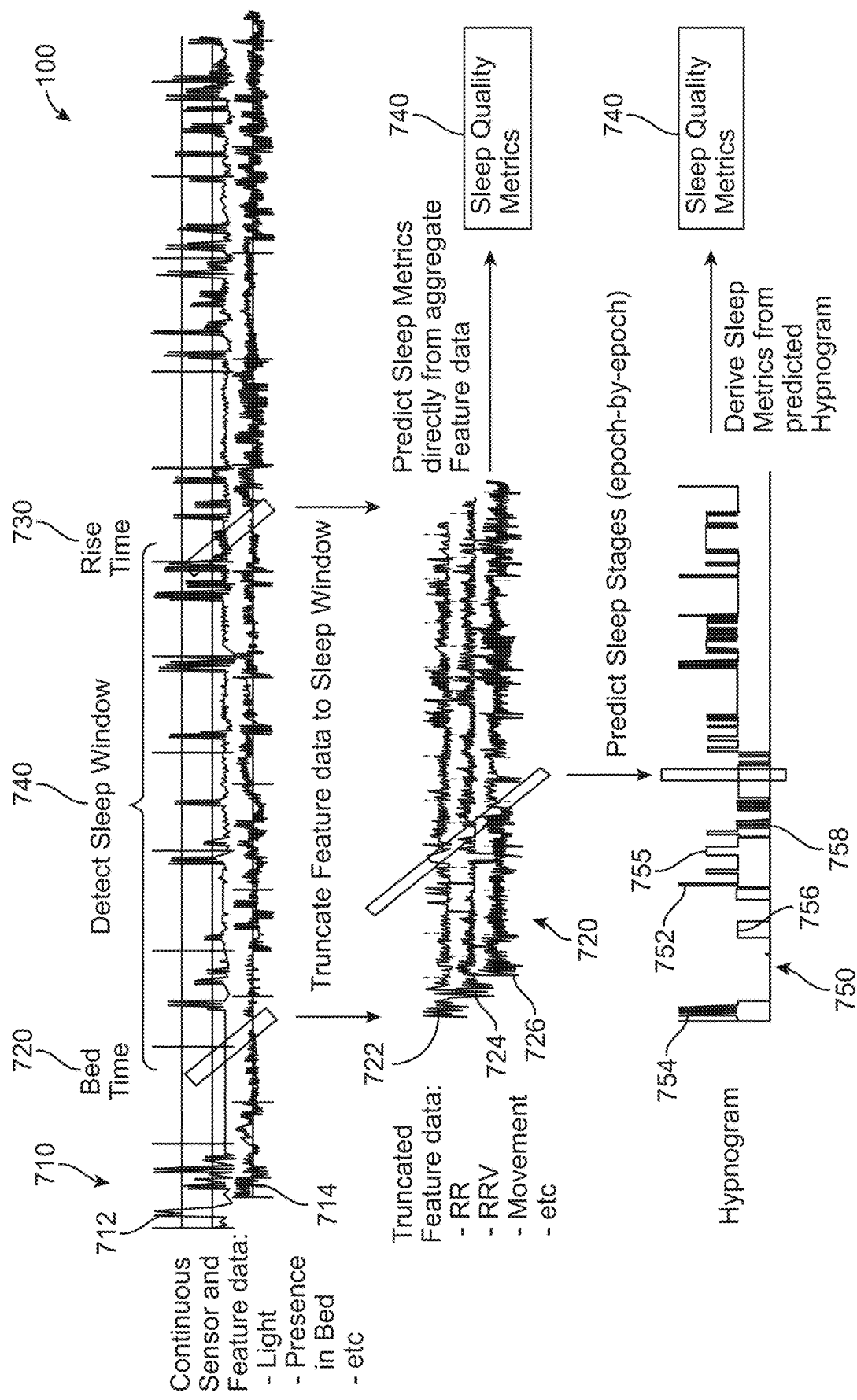
FIG. 7 is a schematic overview of sleep analysis methods, in accordance with at least one embodiment of the present disclosure.

FIG. 7 is a schematic overview of sleep analysis methods (see FIG. 2. Feature 5), in accordance with at least one embodiment of the present disclosure. The sleep window is estimated from continuous sensor and Feature data as described above. A sleep stage classification model is applied to truncated Feature data. Sleep Quality metrics are computed from hypnogram, or directly predicted from truncated Feature data.

In the example shown in FIG. 7, the vital sign monitoring system 100 includes raw sensor data 710 (e.g., sensor data streams 712 and 714, although in some embodiments more or fewer sensor outputs may be tracked). From the raw sensor data, the system 100 (e.g., an on-board processor of the apparatus 120 as described above, or a processor in a remote server 150 as shown for example in FIG. 1) computes the patient's bed time 720 and rise time 730. A sleep window 740 is then defined as the time period between the bed time 720 and rise time 730.

Next, the raw data 710 is truncated only raw data 710 collected only during the sleep interval 740, and then processed as described above to yield sleep data 720. The sleep data 720 may for example include respiration rate 722, respiration rate variability 724, movement 726, or other data 720 that may be relevant to sleep stages or sleep quality. From this information, sleep quality metrics 740 can be computed, as described below.

The sleep data 720 may also be used to compute a hypnogram 750, which includes for example a graph line 754 that moves to different levels at different times. In an example, the X-axis of the hypnogram 750 represents time, while the Y-axis of the hypnogram represents different levels of sleep (e.g., levels 752, 755, 756, and 758 as shown in FIG. 7, although different levels or numbers of levels may be used instead or in addition). In an example, different levels in the hypnogram 750 may for example represent sleep stages such as waking, light sleep, deep sleep, and REM sleep, although other sleep stages or levels may be used instead or in addition. Sleep quality metrics 740 may also be calculated from the hypnogram 750, instead of or in addition to being computed directly from the sleep data 720.

Studying sleep is traditionally done using electroencephalography (EEG). By studying brainwaves of a sleeping patient, distinct sleep stages can be identified. Sleep stages include: Wake, rapid eye movement (REM) sleep, and Non-REM sleep. Non-REM sleep can again be subdivided into Light sleep and Deep sleep, or N1, N2, and N3. A sleep stage may be assigned to every 30 second epoch of data, leading to a hypnogram, or the progression of sleep stages throughout the night. A problem is that EEG-based sleep studies may be uncomfortable to the patient and are performed in a dedicated sleep lab. As a result of this, it can be difficult to study sleep in a naturalistic environment (at the patient's home, without uncomfortable electrodes). In addition, a sleep technician may be required to score sleep data epoch by epoch, making sleep studies subjective and costly.

Some wearable 'headband' type devices can study sleep from EEG data in combination with an automated sleep stage classifier. Wearable EEG devices however may be uncomfortable to the user and may offer limited signal quality. Various devices may be used to study sleep from signals other than EEG. For example, wrist-worn devices can capture heart rate, motion, and respiratory rate. This physiological data can be fed to an automated classifier in order to predict sleep stages. Wearable devices may however be cumbersome to the user, and may offer limited accuracy. Some devices are intended to be attached to the bed or mattress of the user. Pressure or movement sensors may be used to monitor physiological signals such as heart rate, respiratory rate, and movement. Again, an automated classifier may be used to predict sleep stages for each of the epochs. Again, accuracy may be limited. Additionally, these types of devices may suffer from discomfort, high cost and complexity of installation.

The vital sign monitoring system 100 of the present disclosure may include a method for contactless monitoring of sleep, using data as obtained through the apparatus 120 (described for example in FIG. 2, Feature 1: Apparatus for non-contact continuous acquisition of human physiological and behavioral data) User physiological feature data 720 are obtained from raw sensor data 710 using the previously described method (See FIG. 2. Feature 2: Method for remote sensor physiological feature data extraction), for each (e.g., 15-second, 30-second, 60-second, etc.) epoch. When a feature (such as respiratory rate) is computed at different intervals than 30 s, data may be resampled From continuous (e.g., 24/7) data, sleep windows may be determined automatically (as described for example in FIG. 2. Feature 4: Method for automatic sleep window detection from multiple sensor data) Physiological feature data may be truncated to the sleep window, and used to estimate user sleep state on an epoch-by-epoch basis. Each epoch may be classified as one of several sleep stages, using an automatic prediction method, producing a hypnogram. Sleep Quality Metrics 730 may be derived directly from hypnogram data according to clinical standards. A schematic overview of the Sleep Analysis methods is given in FIG. 7.

Predictive Model

The following exemplary method may be applied to feature data truncated to a sleep window. All truncated feature data are fed to a predictive model, which is operated on a remote server. The predictive model may also run on the apparatus, or on a local processing device. In an example, the predictive model classifies each epoch (e.g., each 30-second epoch) as one of the following sleep states: Wake, REM, N1, N2, or N3. The classifier may also be simplified to distinguish only between sleep stages in one of the following sets: Wake, REM. Light, Deep, or REM, Non-REM, or Wake, Sleep. In one embodiment, the predictive model is trained on discrete classes representing the sleep stages of interests, with the aim of predicting discrete stages. In an alternative embodiment, instead of using discrete classes (such as Wake and REM), a predictive model may also be trained to produce a continuous metric of 'sleep state'. For this case, a two-step approach may be used. Sleep data are first classified as either of the discrete classes REM or Non-REM. If classified as Non-REM, a second step predicts a continuous sleep depth metric, ranging from N3 (Deep) sleep, to Wake. Thus, in this example, Wake, Light and Deep sleep are considered a continuum, and are predicted as such. REM sleep may be considered a different state entirely.

Predicted continuous hypnogram data may be converted to traditional discrete hypnograms by rounding the sleep depth metric to the nearest corresponding sleep state. In this manner, conventional sleep quality metrics can be obtained. An additional step of post-processing may be applied to the resulting predicted hypnograms. Post-processing may include the smoothing of temporary changes in sleep stages. Standardized sleep metrics (such as total sleep time, or percentage spent in REM sleep) may be derived from predicted hypnograms according to clinical standards (for example: American Academy of Sleep Medicine).

Training the Model

The predictive model may be based on machine learning and trained using a large amount of training data. In an example, each of the training datasets contains features as obtained using the apparatus for each epoch, as well as a label for each epoch. The label represents the sleep state, and is assigned by one or multiple qualified sleep technician(s) based on simultaneously obtained data from a validated EEG-based device (the gold standard). If the model is used to predict a continuous sleep depth metric, the input data is also converted to a continuous scale Conversion to continuous scale may done by assigning numbers to sleep stages (Wake=3, N1=2, N2=1, N3=0). The numbered input data may be smoothed, for example, using a 5-minute averaging window. Alternative smoothing techniques (different window lengths) may be applied. Smoothing discrete data allows for gentle transitions between discrete sleep stages, as well as 'intermediate' sleep stages for cases when it is not certain which discrete sleep state a person is in, leading to rapid changes in sleep state or disagreement between different scorers.

Model Implementation

In a non-limiting example, the predictive model is an implementation of gradient boosted decision trees. The model may be trained using a leave-one-subject-out cross validation approach. 10 Forward and 10 backward lags may be used (each corresponding to n minutes of data, where 1<n<60, for both forward and backward lags, in case a sleep epoch length of 30 seconds is chosen). This allows the model to consider both feature data and predicted data before and after the epoch of interest.

An alternative option to a decision trees model, is the use of an ensemble of different models, such as a stack of convolutional neural networks (CNN) and decision trees. In this case, the output of the CNN may for example be combined with the feature time-series and fed to gradient boosted decision trees.

Alternative: Rest/Activity Classifier

An alternative option to sleep stage prediction in a defined sleep window is to predict rest and activity from continuous (24/7) data. Instead of EEG-derived sleep stage data, the epochs may be labeled by actigraphy data. Rest and Activity labels may also be assigned based on a combination of EEG-based sleep analysis (providing accurate sleep/wake labels during the sleep window) and actimetry data (providing rest/activity labels while subject is not in bed). In this manner, the apparatus and method may be used as a non-contact alternative to wrist-worn actimetry, providing valuable insights into a user activity patterns. In this case, model development and training may be similar to the case described above.

Alternative: Direct Sleep Metric Prediction

Instead of predicting a progression of sleep stages epoch-by-epoch, and subsequently deriving standardized sleep metrics from the hypnogram, sleep quality metrics may be predicted directly from the aggregate of all feature time-series data for the entire sleep window. In an example, all obtained feature data are fed to a classifier, to predict standardized sleep quality metrics 740 (as defined for example by the American Academy of Sleep Medicine) such as:

Total sleep time: Total number of minutes asleep in the sleep window.

Sleep Efficiency: Percentage of the time in bed (sleep window) that the user was asleep.

Sleep onset latency: Number of minutes from sleep window onset until the first consolidated section of non-wake.

Wake after sleep onset. Number of minutes awake, counted from the first consolidated section of non-wake until the end of the sleep window (rise time).

Percentage REM sleep: Percentage of the Total Sleep Time that the user was in REM sleep.

Percentage Deep sleep: Percentage of the Total Sleep Time that the user was in Deep sleep.

REM onset latency: Number of minutes counted from the first consolidated section of non-wake until the first REM sleep section.

The classifier may also be used to predict subjective, user-reported metrics regarding sleep quality. Example metrics include:

Subjective sleep quality

Level of feeling refreshed after a night of sleep

Mood after a night of sleep

The classifier may for example be based on machine learning and trained using multiple datasets. Each of the training datasets may contain sets of features as obtained using the apparatus for the entire sleep window. In addition, training datasets contain target labels. Target labels are sleep quality metrics as obtained using the current clinical standard. Asleep study is performed using an EEG-based device, scored by a certified sleep technician, and sleep metrics are derived from the resulting hypnogram. Sleep study data and feature data should be recorded simultaneously. Subjective sleep quality metrics may be obtained through a simple questionnaire. The machine learning classifier may be an ensemble of various models, including convolutional neural networks and decision trees as described above.

Feature 6: Method for Health, Sleep and Behavior Data Analysis

Raw sensor data, physiological feature data, hypnogram data and sleep metric data, as collected through the apparatus and methods, may be used for long-term monitoring of patient sleep, health, and behavior. For all obtained data, alerts are generated when data exceed a predetermined threshold, which could identify potentially adverse events. Notifications are issued when long term trends (changes) are detected in obtained data. Further analyses are performed on a remote server as described below:

Health Analysis

In an exemplary method, respiratory rate data, respiratory waveform data, and respiratory feature data are analyzed continuously using rolling windows for monitoring of health and early detection of adverse events, in the following manner. Respiratory rate (RR) is monitored continuously and compared to user-defined Lower and Upper RR threshold values, which together describe a 'healthy' RR range. If sustained RR outside of the healthy range is detected, an alert may be triggered, either for tachypnea (abnormally rapid breathing) or bradypnea (abnormally slow breathing). Similarly, an alert may be triggered if sustained RR outside the individual patient's usual range is detected, or when an upward or downward trend in RR is detected. What constitutes 'sustained' may be user defined. An average RR within a 30 min may for example used by default. For higher acuity settings, or for patients at risk of quick deterioration, a healthcare professional may choose a shorter averaging window.

In another exemplary method, respiratory rate data, respiratory waveform data, and respiratory feature data may be filtered prior to continuous analysis using rolling windows, such that only physiological data measured at a predetermined set of distances is included for analysis. The predetermined range may correspond to the user bed, which ensures that only physiological data recorded while the user is at rest is used for analysis. Similarly, physiological data may be filtered prior to analysis, such that only data obtained while the user is asleep is included. Physiological data (such as RR) at rest may be more indicative of health and adverse events, as it is less affected by user activities and external factors.

The metrics Average, Minimum, and Maximum RR, as well as distribution metrics Median, 1st quartile, 3rd quartile RR, may for example computed for all RR values obtained in the past 60 minutes, as well as in the past 24 hours of a patient. R-score, a novel metric representing the amount of tachypnea and bradypnea, is then computed as follows:

Positive R score: The total number of breaths that were recorded above the Upper RR threshold in the past 24 hours.

Negative R score: The total number of breaths that were recorded below the Lower RR threshold in the past 24 hours.

Both +R score and −R score are thus computed as an integral of the absolute difference between measured RR and RR thresholds, only for the sections where RR exceeds the thresholds.

Respiratory Trend data: A notification is issued if median hourly or daily RR shows a trend (increasing or decreasing) over the course of multiple hours or days. By default, an analysis window length of 2-10 days is set, with a trend being detected through regression analysis. Respiratory waveform feature data are used to identify various respiratory patterns associated with illness, such as:

Obstruction, occurring in COPD and Asthma, detected from an increased RR and increased duration of expiratory phase.

Shortness of breath, detected from reduction in breath amplitude and increased RR, is associated with conditions such as pneumonia, sepsis, acute respiratory distress, and COVID-19.

Ventilatory depression, detected from a reduction in RR, is associated with respiratory failure and opioid overdose.

Apnea and hypopnea, detected from pauses in breathing exceeding 10 seconds or reductions in breathing amplitude, caused by obstructive sleep apnea or central sleep apnea.

Other particular respiratory patterns may be detected, including but not limited to Kussmaul, ataxic breathing, Biot breathing. Cheyne-Stokes breathing, periodic breathing, air trapping, sighing, apneustic breathing, agonal breathing.

For all respiratory patterns indicating potential adverse events or risk of deterioration, notifications and alerts may be issued to healthcare professionals. Respiratory pattern recognition may for example rely on rule-based algorithms defined by current clinical standards. For example: an apnea event may be defined as a cessation of breathing of 10 seconds or more. Or, an increase of RR exceeding 4 breaths per minute over the course of 5 days may be predictive for acute exacerbation of COPD patients. Alternatively, respiratory pattern recognition may be performed using a machine learning model trained on clinical data and diagnosis. Additional respiratory feature alerts may be defined by healthcare professionals, for individual patients, through a web portal. Microphone data may be used to detect coughing and wheezing, which are clinically used to monitor respiratory conditions.

Monitoring of respiration may be improved through a combination of microphone data and respiration data from the radar sensor. In an example, as the radar sensor tracks the respiration-induced periodic displacement of the chest and abdomen, the microphone may be used to pick up the auditory respiration signal. Both sensor modalities may be merged for increased robustness of respiratory measurement. In addition, the combination of both modalities can be employed to accurately diagnose apnea-related events. In case of obstructive sleep apnea, an apnea event is caused by an obstruction of the airways, leading to a total cessation of airflow. This may result in a complete silence during the event, while the radar sensor might still detect respiratory effort of the chest and abdomen, which are struggling to breathe. A hypopnea (characterized by abnormally slow or shallow breathing) may be challenging to identify using a microphone alone, as the respiratory audio signal may continue. A hypopnea can be picked up by a radar sensor as a reduction in respiratory amplitude or frequency by monitoring abdomen and chest wall motion. In case of an apnea event of a patient struggling from central sleep apnea, the cessation of breathing as picked up by a microphone, may coincide with a complete lack of chest and abdomen effort as picked up by a radar sensor. Thus, by combining radar and microphone data, a distinction can be made between central sleep apnea and obstructive apnea events, as well as between apnea and hypopnea events.

In a similar fashion to RR health monitoring, heart rate and heart rate variability may be monitored, triggering alerts if HR or HRV at rest exceed user-defined thresholds.

Sleep Analysis

Sleep data (as obtained using the method described in Feature 5: Method for sleep analysis from remote sensor physiological feature data) may be analyzed on a night-by-night basis, to detect trends and abnormalities. Sleep quality metrics may be monitored, and an alert or notification issued when a metric deviates from the healthy target range (defined by standard clinical practice), from a user-defined range, or from historical data of the same patient. Sleep Quality Metrics may also be used to diagnose and quantify sleeping problems and disorders such as insomnia. A 'sleep efficiency' below 85% or a 'sleep onset latency' over 20 minutes is typically associated with insomnia and, if chronic, deserves the attention of a healthcare professional. Sleep Quality Metrics may help a health care provider tailor sleep improvement therapies such as Cognitive Behavioral Therapy. In addition, Sleep Quality Metrics may be used to monitor progress of patients being treated for insomnia.

Sleep window regularity and timing may be analyzed to identify potential circadian rhythm disorders, or alert healthcare professionals of an irregular sleep window. The standard deviation of bed time and rise time from a patient's mean (in the past 7 days) may be computed to assess sleep window regularity. A patient's bed time and rise time may be monitored over time to identify potential delay or advancing in the sleep/wake rhythm. A patient's bed time and rise time may be correlated to sleep quality metrics, to find a patient's optimum sleep window. Movement data during the sleep window may be used to quantify the number of immobile minutes and active minutes during a sleep session. Number of immobile minutes may be considered a relevant metric to assess whether a patient experiences restful nights. Although no predefined thresholds exist, restful sleep is crucial for recovery of any medical condition and thus of relevance for healthcare professionals. In addition, microphone data during the sleep window may be used to detect snoring, a risk factor for obstructive sleep apnea.

Behavioral Analysis

User range data may be used to quantify:

Real time bed occupancy.

Time that the patient spends in bed in a 24-hour cycle.

Time that the patient spends in their room in a 24-hour cycle.

Time that the patient spends in other locations in the room with a known distance, for example, a chair may be located at a distance of 2 m to the apparatus, as defined by the patient or caretaker Number of active minutes during which the patient changes location, in a 24-hour cycle.

Bed exits and fall risk. Bed exits increase the risk of falls in elderly patients, particularly for patient that are known to be prone to falling. An alert may be triggered if an elderly patient exits the bed, such that a healthcare professional may come and assist. Similarly the alert may be limited to times when an exit was detected and the patient subsequently does not return to the bed within a predetermined window (for example 10 minutes). The alert may be set to fire only during high risk times, for example shifts with low numbers of healthcare professionals, or the nocturnal window. What constitutes 'nocturnal' may be defined for example by a patient's sleep window, which may be set by a healthcare professional, or which may be estimated from average automatically detected sleep windows in previous days.

Movement data may be used to quantify:

Number of active minutes during which movement is detected above a certain threshold (a threshold in the range of 0.2-0.5 may be suitable for the movement detection algorithm described in Feature 2: Method for remote sensor physiological feature data extraction), e.g., in a 24-hour cycle.

Number of inactive minutes, during which patient presence is detected but motion is below a certain threshold (a threshold in the range of 0.2-0.5 may be suitable for the movement detection algorithm described in Feature 2. Method for remote sensor physiological feature data extraction), in a 24-hour window.

Fall detection. Falls occurring within the device detection range may be directly detected by their movement signature: High accelerated motion and change of user range, followed by an absence of change in user range, possibly aided by microphone data. Similarly, falls may be prevented by detecting the movement pattern associated with getting up from bed or preparing the to exit the bed. An alert may be sent to a healthcare professional when a potential fall is detected.

Change of position while in bed. High levels of motion followed by a change in radar IQ data demodulation settings for respiratory waveform acquisition, indicate that the patient has changed position. Regular change of position may be of importance to prevent pressure ulcers.

Bedroom Analysis

In an exemplary method, bedroom analysis is performed to help a patient develop a more sleep-conducive bedroom. Number of lights on' events, detected during a sleep session (patient defined, or automatically detected), may be counted. Number of minutes in which sound was above (for example) 60 dB, during a sleep session (patient defined, or automatically detected), may be counted. Daily light exposure may be measured as an integral over the 24-hour illumination levels. Daily light exposure may be of importance for healthy sleep, and low levels of light may be associated with depression. Environmental sensor data (light levels, sound levels, temperature, air quality) recorded during a sleep session (user defined or automatically detected), may be compared to optimal bedroom environment recommendations, to inform a patient on how to improve their bedroom environment. Environmental sensor data (light levels, sound levels, temperature, air quality) recorded during a sleep session (user defined or automatically detected), may be correlated with sleep quality metrics, to educate a patient on how their bedroom environment affects their sleep and help a patient optimize their sleep environment.

Feature 7: Method for Alerts and Notifications

Continuous automatic data analysis (as described in Feature 6: Method for Health, Sleep and Behavior data Analysis) may allow for early detection of potentially adverse events, and early interventions if healthcare staff are being notified. In an exemplary method, alerts are implemented according to one or more of the following. Visual alerts on screen: Through accompanying software platforms (described in Feature 8. Method for Data Monitoring and Visualization), visual warnings may be displayed if an alert has been triggered. Notifications on mobile devices: Through accompanying software platforms running on mobile devices, warnings and notifications may be pushed to mobile devices. Mobile text alerts: Mobile phone numbers of healthcare professionals/care takers can be associated with particular patient or particular event alerts. Mobile text alerts may be sent to the appropriate healthcare professional if a potentially adverse event is detected. An acknowledgement functionality may allow a healthcare professional to silence recurring warnings for a particular patient/event combination, to avoid alerts recurring if the patient condition (for example sustained RR) does not change. Email alerts: Notifications, reports and alerts may be sent directly to relevant healthcare professionals through email. Fax alerts: Notifications, reports and alerts may be sent directly to relevant fax machines in a relevant healthcare facility or office of a healthcare professional.

In various embodiments, the various systems and methods for described herein, can be implemented via computer software or hardware and various components can be connected via a direct connection or through an internet connection.

It should be appreciated that the various engines and features depicted in various system and method embodiments herein can be combined or collapsed into a single engine, component or module, depending on the requirements of the particular application or system architecture. Moreover, in various embodiments, the systems can comprise additional engines or components as needed by the particular application or system architecture.

Figure 8:
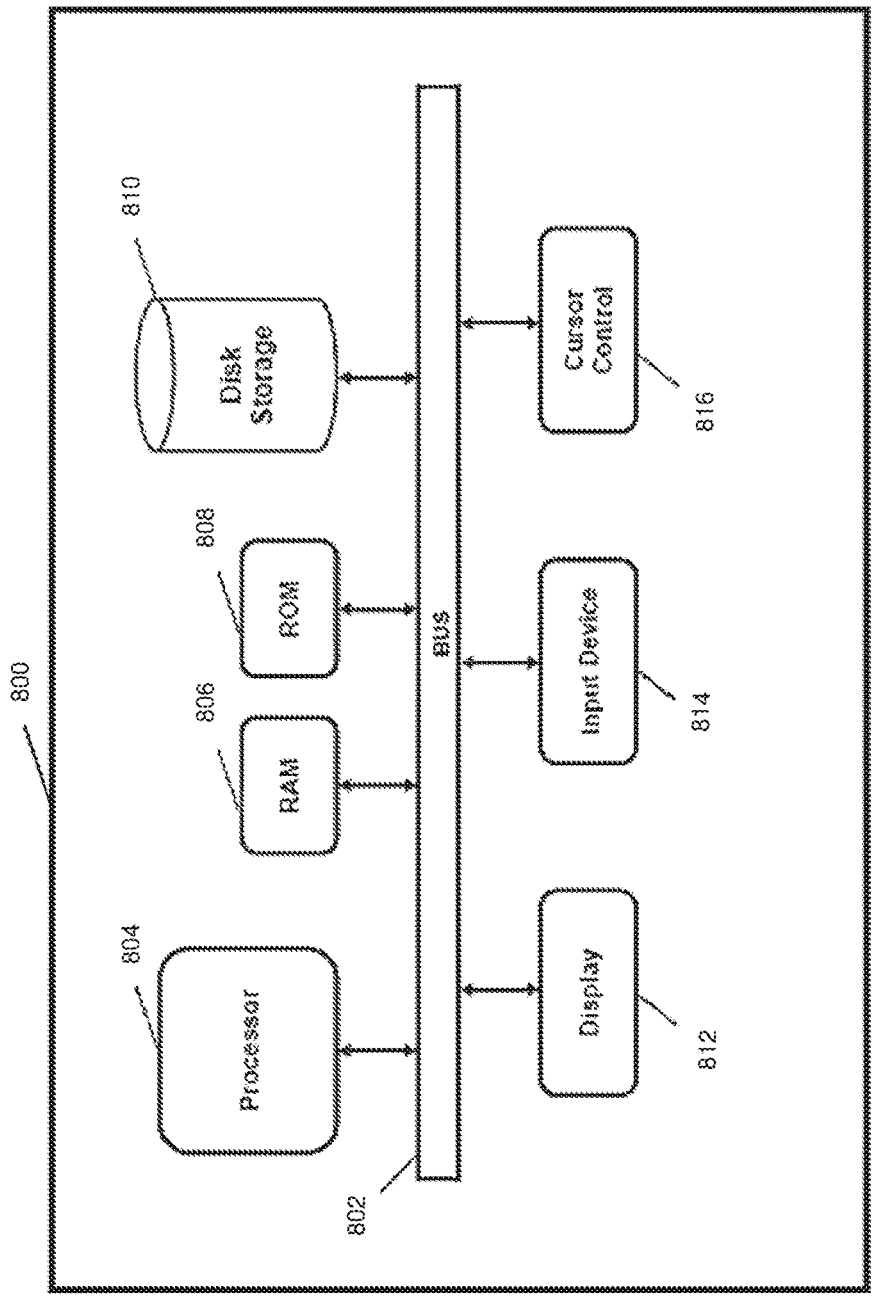
FIG. 8 is a block diagram illustrating a computer system for use in performing systems and methods provided herein, in accordance with various embodiments.

FIG. 8 is a block diagram illustrating a computer system 800 upon which embodiments of the present teachings may be implemented. In various embodiments of the present teachings, computer system 800 can include a bus 802 or other communication mechanism for communicating information and a processor 804 coupled with bus 802 for processing information. In various embodiments, computer system 800 can also include a memory, which can be a random-access memory (RAM) 806 or other dynamic storage device, coupled to bus 802 for determining instructions to be executed by processor 804. Memory can also be used for storing temporary variables or other intermediate information during execution of instructions to be executed by processor 804. In various embodiments, computer system 800 can further include a read only memory (ROM) 808 or other static storage device coupled to bus 802 for storing static information and instructions for processor 804. A storage device 810, such as a magnetic disk or optical disk, can be provided and coupled to bus 802 for storing information and instructions.

In various embodiments, computer system 800 can be coupled via bus 802 to a display 812, such as a cathode ray tube (CRT) or liquid crystal display (LCD), for displaying information to a computer user. An input device 814, including alphanumeric and other keys, can be coupled to bus 802 for communication of information and command selections to processor 804. Another type of user input device is a cursor control 816, such as a mouse, a trackball or cursor direction keys for communicating direction information and command selections to processor 804 and for controlling cursor movement on display 812. This input device 814 typically has two degrees of freedom in two axes, a first axis (i.e., x) and a second axis (i.e., y), that allows the device to specify positions in a plane. However, it should be understood that input devices 814 allowing for 3-dimensional (x, y and z) cursor movement are also contemplated herein.

Consistent with certain implementations of the present teachings, results can be provided by computer system 800 in response to processor 804 executing one or more sequences of one or more instructions contained in memory 806. Such instructions can be read into memory 806 from another computer-readable medium or computer-readable storage medium, such as storage device 810. Execution of the sequences of instructions contained in memory 806 can cause processor 804 to perform the processes described herein. Alternatively, hard-wired circuitry can be used in place of or in combination with software instructions to implement the present teachings Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 804 for execution. Such a medium can take many forms, including but not limited to, non-volatile media, volatile media, and transmission media. Examples of non-volatile media can include, but are not limited to, dynamic memory, such as memory 806. Examples of transmission media can include, but are not limited to, coaxial cables, copper wire, and fiber optics, including the wires that comprise bus 802.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM. PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 804 of computer system 800 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 800 as a stand-alone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 800, whereby processor 804 would execute the analyses and determinations provided by these engines, subject to instructions provided by any one of, or a combination of, memory components 806/808/810 and user input provided via input device 814.

Figure 9:
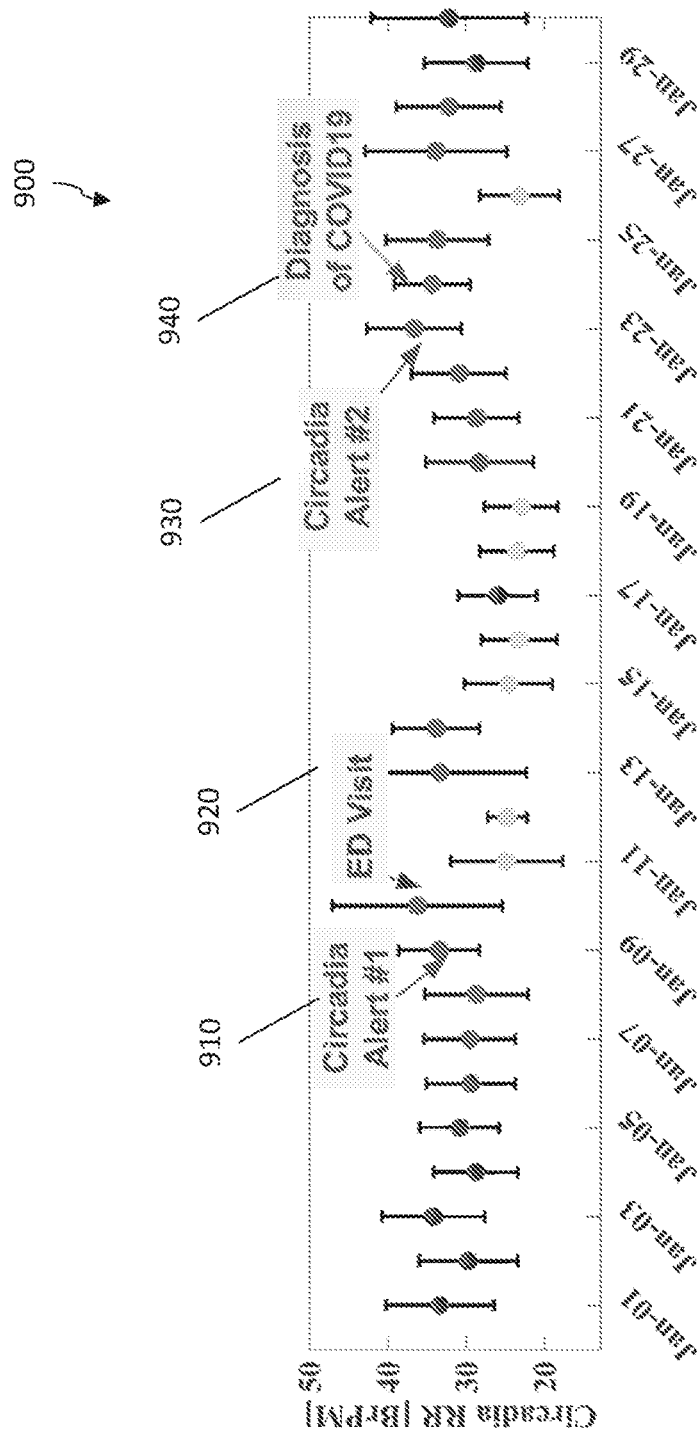
FIG. 9 shows an example graph of respiration rate over time, in accordance with at least one embodiment of the present disclosure.

FIG. 9 shows an example graph 900 of respiration rate over time, in accordance with at least one embodiment of the present disclosure. The system of the current disclosure triggered alerts for high respiratory rate, leading to an escalation of care. The first alert 910 triggered a clinical assessment, leading to an emergency department (ED) visit 920. The second alert 930 (Jan-23) was sent one day prior to a COVID-19 diagnosis 940, after which the patient was positioned upright to improve passageways for breathing, visibly alleviating tachypnea symptoms.

Respiratory rate (RR) has been shown to be an early indicator for a wide range of complications, and high RR is known to be a predictor for admission into the intensive care unit, as well as for hospital mortality. Despite this, vital signs such as RR are measured in a hospital setting typically at 4-hour intervals, and even less frequently in low acuity settings such as the nursing home. Due to the low frequency of intermittent spot measurements, health care professionals often miss half of all serious and prolonged hypotensive episodes, and more than 90% of serious and prolonged desaturation episodes. The diagnosis of tachypnea (elevated RR), one of the earliest signs of pulmonary decompensation, may therefore be considerably delayed when relying on routine spot measurements.

The challenge with infrequent vital sign monitoring has become even more apparent for patients suffering from COVID-19. Typically, their course is benign, but a fraction of patients deteriorates, often rapidly and unexpectedly. As with other infections, RR is often the first vital sign to change when a patient starts to deteriorate. In hospitalized COVID-19 patients, an RR value of over 24 breaths per minute has been associated with mortality. From electronic health record data of hospitalized COVID-19 patients, RR was found to be the strongest predictor of ICU transfer, and for need of mechanical ventilation. A continuous system for RR monitoring, such as the current disclosure, could alert healthcare professionals of tachypnea and decompensation far earlier than when depending on spot measurements. Recognition of even subtle changes in basic vital signs may allow clinicians to detect deterioration well before serious adverse events occur. Consequent clinical interventions may prevent complications, or at least moderate their severity.

Due to the novelty of the current system, evidence of clinical outcome improvements specifically for COVID-19 patients is not yet available. A clinical trial (a single-center prospective cohort study) is currently ongoing, with the aim of investigating the use of the current system on a COVID-19 ward for early identification of patients who need escalation of pulmonary care.

Figure 10:
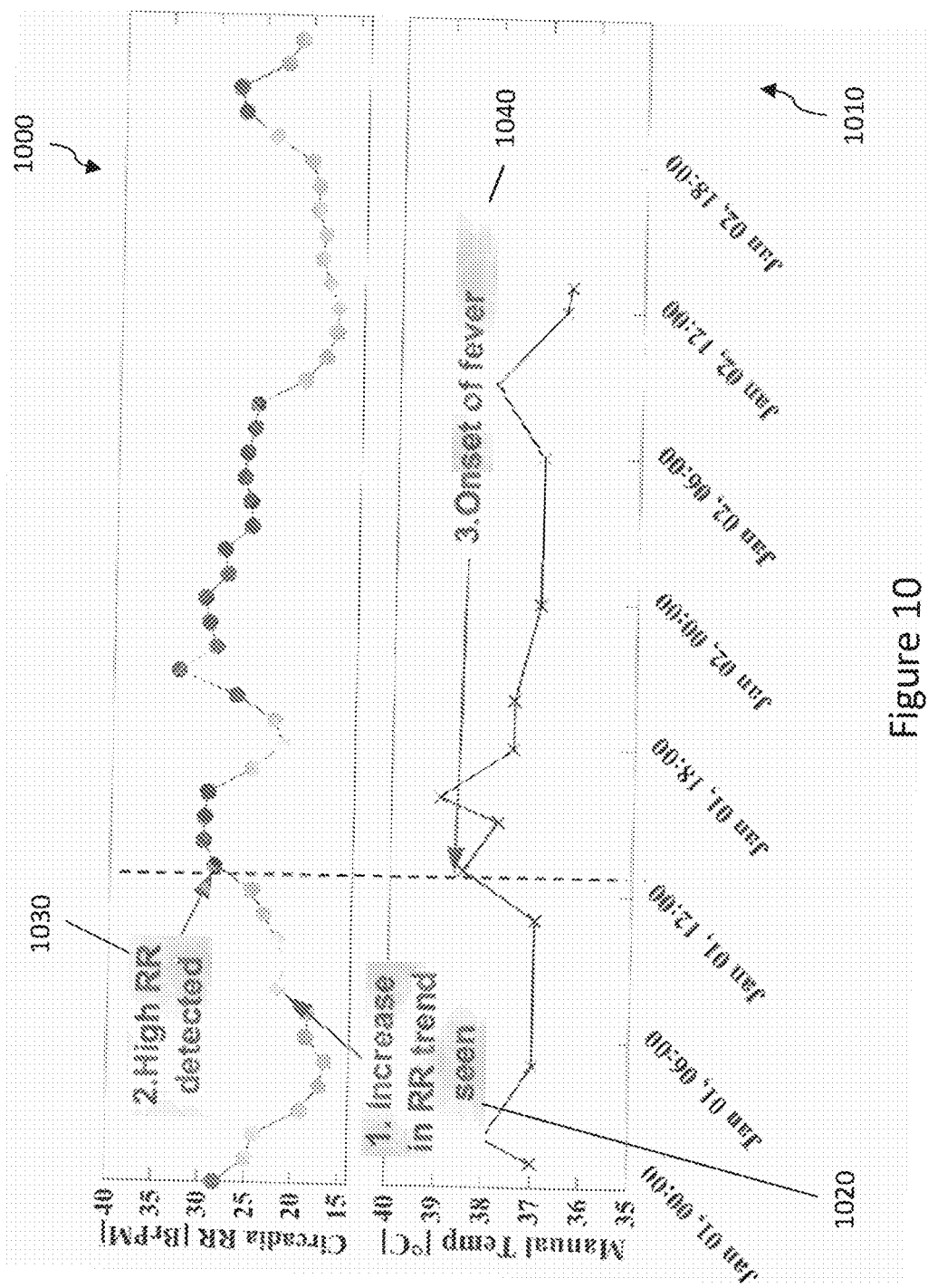
FIG. 10 shows an example graph of respiration rate over time and an example graph of temperature over time, in accordance with at least one embodiment of the present disclosure.
Figure 11:
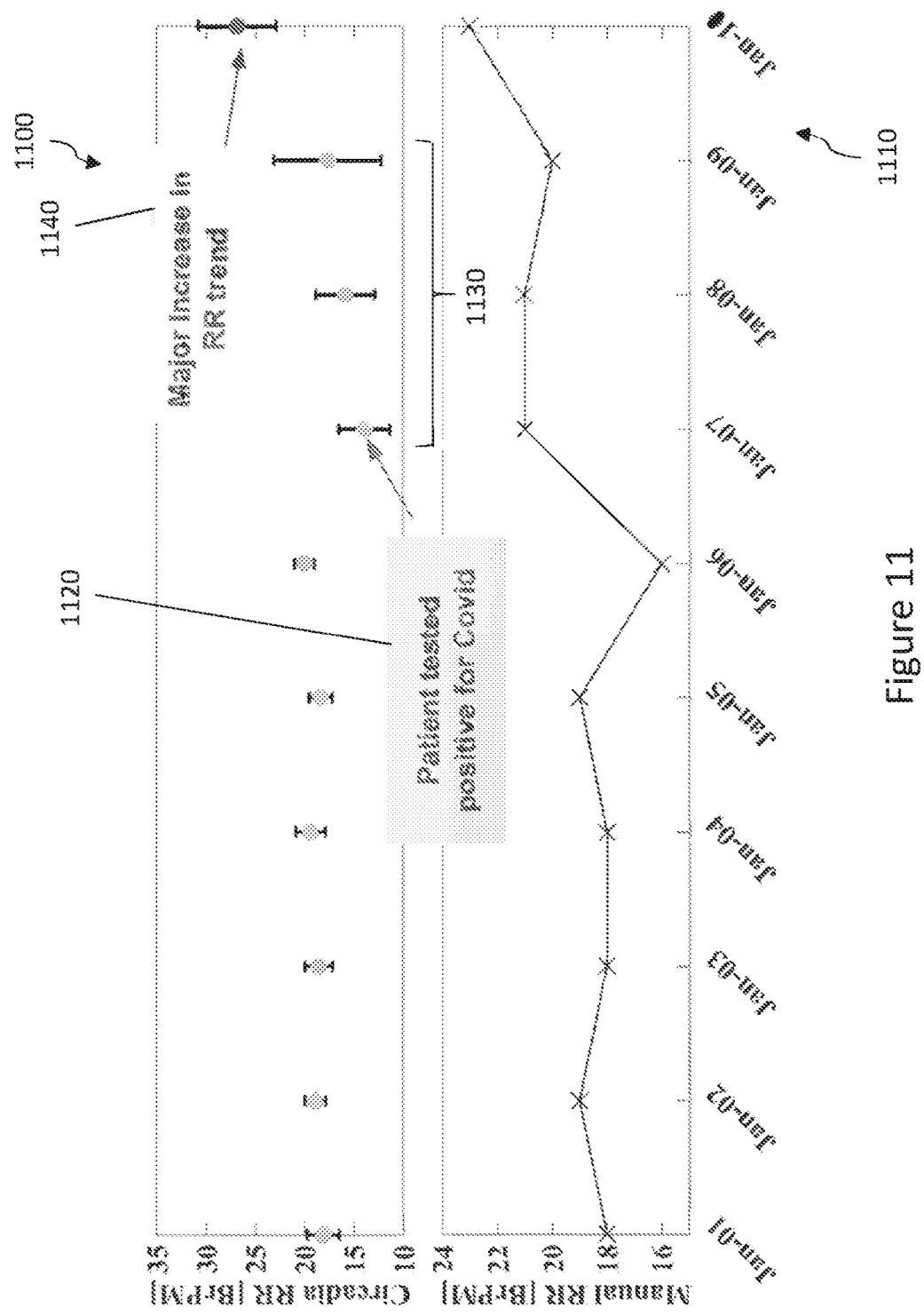
FIG. 11 shows an example graph of respiration rate over time and an example graph of temperature over time, in accordance with at least one embodiment of the present disclosure.

Despite the absence of clinical outcome data, the current system has been validated and found to be accurate for RR monitoring, and is used at present for continuous RR monitoring of patients in nursing homes in the US. Nursing homes have been shown to be extremely vulnerable to outbreaks of COVID-19. Patients with a suspected or confirmed COVID-19 infection must be placed in isolation, and contact with healthcare professionals is reduced to a minimum. The system of the current disclosure has been shown to detect the changes to respiratory state that accompany a COVID-19 infection, and often even precede fever onset. The system has also been used to send timely alerts to nursing home healthcare professionals, to warn them of cases of tachypnea, in some cases before a subsequent COVID-19 diagnosis. In a few tragic instances, tachypnea alerts were triggered for patients with an active COVID-19 infection, who subsequently passed away. Examples of real-world patient data, obtained using the system of the current disclosure, are shown in FIGS. 9-11. Note that all dates have been normalized to January 1st, for de-identification purposes.

FIG. 10 shows an example graph 1000 of respiration rate over time and an example graph 1010 of temperature over time, in accordance with at least one embodiment of the present disclosure. A patient with mild COVID-19 pneumonia showed an upward trend 1020 in respiratory rate (RR) for several hours before fever 1040 was first noted by routine spot measurements. A measurement of high respiratory rate 1030 approximately coincided with the onset of fever 1040. This demonstrates the sensitivity of the disclosed system to changes to physiological state that accompany COVID-19 infections.

FIG. 11 shows an example graph 1100 of respiration rate over time and an example graph 1110 of temperature over time, in accordance with at least one embodiment of the present disclosure. The graphs 1110 and 1110 show respiratory rate (RR) and temperature data of a nursing home patient diagnosed with COVID-19. Subsequent to the COVID-19 diagnosis 1120, the system of the current disclosure detected a strong trend 1130 in RR, as well as in RR variability, up to four days prior to the patient's demise on January 10th, and showed a major increase 1140 in respiration rate immediately prior to the patient's demise.

As will be readily appreciated by those having ordinary skill in the art after becoming familiar with the teachings herein, a number of variations are possible on the examples and embodiments described above. The logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the description.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vital sign monitoring system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Subheadings within the text are not meant to be limiting but merely to organize concepts within the text. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the vital sign monitoring system as defined herein. Although various embodiments of the subject matter have been described above with a certain degree of particularity, or with reference to one or more individual embodiments, those skilled in the art could make numerous alterations to the disclosed embodiments without departing from the spirit or scope of the described subject matter.

Still other embodiments are contemplated. It is intended that all matter contained in the above description and shown in the accompanying drawings shall be interpreted as illustrative only of particular embodiments and not limiting Changes in detail or structure may be made without departing from the basic elements of the subject matter as defined in the following claims.

RECITATION OF EMBODIMENTS

Embodiment 1: A system for monitoring health of a patient, the system comprising: a touchless sensing device disposed within a sensing range of the patient, wherein the touchless sensing device comprises at least one touchless sensor configured to receive raw data relating to a health status of the patient; and at least one processor configured to: receive the raw data from the at least one touchless sensor; compute physiological data from the raw data: compute health metrics from the physiological data; and display the health metrics or the physiological data on a display device in communication with the at least one processor.

Embodiment 2: The system of embodiment 1, wherein the at least one touchless sensor comprises at least one of a radar sensor, an ultrasonic sensor, a light sensor, or a microphone, and wherein the raw data comprises motion data and proximity data of the patient.

Embodiment 3: The system of any of embodiments 1-2, wherein the at least one touchless sensor is configured to receive raw data relating to the health status of the patient at a plurality of distances within the sensing range.

Embodiment 4: The system of any of embodiments 1-3, wherein the physiological data includes at least one of heart rate, cardiac waveform, respiration rate, respiration waveform, movement data, or sleep.

Embodiment 5: The system of any of embodiments 1-4, wherein the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, or a mood.

Embodiment 6: The system of any of embodiments 1-5, wherein the health metrics include behavioral metrics comprising at least one of a time spent in bed, a time spent in a patient room away from the bed, movements or activities throughout the patient room, bed exits and entries, falls, immobile minutes in bed, or changes of position.

Embodiment 7: The system of any of embodiments 1-6, wherein at least one processor of the at least one processor is disposed within the touchless sensing device.

Embodiment 8: The system of any of embodiments 1-7, wherein at least one processor of the at least one processor is accessible by the touchless sensing device via a network.

Embodiment 9: The system of embodiment 8, wherein at least a portion of the network comprises a mesh network.

Embodiment 10: The system of any of embodiments 1-9, wherein the display device comprises a desktop computer, laptop computer, notebook computer, tablet computer, smartphone, smart watch, or smart glasses.

Embodiment 11: The system of any of embodiments 1-10, wherein computing the physiological data from the raw data involves excluding raw sensor data from people other than the patient or sources of motion other than the patient.

Embodiment 12: The system of any of embodiments 1-11, wherein displaying the health metrics or physiological data includes displaying at least one of statistics, trends, alerts, insights, diagnostics, or visualizations.

Embodiment 13: The system of any of embodiments 1-12, wherein the health metrics include at least one of tachypnea, bradypnea, respiratory rate variability, tachycardia, bradycardia, heart rate variability, an upward or downward trend in respiration rate, an R score, a breathing obstruction, a shortness of breath, a ventilatory depression, apnea, a hypopnea. Kussmaul breathing, ataxic breathing. Biot breathing. Cheyne-Stokes breathing, periodic breathing, air trapping, sighing, apneustic breathing, or agonal breathing.

Embodiment 14: The system of any of embodiments 1-13, wherein the health metrics or vital signs monitor a progression of COVID-19 symptoms.

Embodiment 15: A method for monitoring health of a patient, the method comprising: with a touchless sensing device disposed within a sensing range of the patient and comprising at least one touchless sensor, receiving raw data relating to a health status of the patient at a plurality of distances within the sensing range; and with at least one processor: receiving the raw data from the at least one touchless sensor; computing physiological data from the raw data; computing health metrics from the physiological data, and displaying the health metrics or the physiological data on a display device in communication with the at least one processor.

Embodiment 16: The method of embodiment 15, wherein the at least one touchless sensor comprises at least one of a radar sensor, an ultrasonic sensor, a light sensor, or a microphone, and wherein the raw data comprises motion data and proximity data of the patient.

Embodiment 17: The method of any of embodiments 15-16, wherein the at least one touchless sensor is configured to receive raw data relating to the health status of the patient at a plurality of distances within the sensing range.

Embodiment 18: The method of any of embodiments 15-17, wherein the physiological data includes at least one of heart rate, cardiac waveform, respiration rate, respiration waveform, movement data, or sleep.

Embodiment 19: The method of any of embodiments 15-18, wherein the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, or a mood.

Embodiment 20: The method of any of embodiments 15-19, wherein the health metrics include behavioral metrics comprising at least one of a time spent in bed, a time spent in a patient room away from the bed, movements or activities throughout the patient room, bed exits and entries, falls, immobile minutes in bed, or changes of position.

Embodiment 21: The method of any of embodiments 15-120, wherein at least one processor of the at least one processor is disposed within the touchless sensing device.

Embodiment 22: The method of any of embodiments 15-21, wherein at least one processor of the at least one processor is accessible by the touchless sensing device via a network.

Embodiment 23: The method of any of embodiment 22, wherein at least a portion of the network comprises a mesh network.

Embodiment 24: The method of any of embodiments 15-23, wherein the display device comprises a desktop computer, laptop computer, notebook computer, tablet computer, smartphone, smart watch, or smart glasses.

Embodiment 25: The method of any of embodiments 15-24, wherein computing the physiological data from the raw data involves excluding raw sensor data from people other than the patient or sources of motion other than the patient.

Embodiment 26: The method of any of embodiments 15-25, wherein displaying the health metrics or physiological data includes displaying at least one of statistics, trends, alerts, insights, diagnostics, or visualizations.

Embodiment 27: The method of any of embodiments 15-26, wherein the health metrics include at least one of tachypnea, bradypnea, respiratory rate variability, tachycardia, bradycardia, heart rate variability, an upward or downward trend in respiration rate, an R score, a breathing obstruction, a shortness of breath, a ventilatory depression, apnea, a hypopnea, Kussmaul breathing, ataxic breathing, Biot breathing, Cheyne-Stokes breathing, periodic breathing, air trapping, sighing, apneustic breathing, or agonal breathing.

Embodiment 28: The method of any of embodiments 15-27, wherein the health metrics or vital signs monitor a progression of COVID-19 symptoms.

What is claimed is:

1. A system for monitoring health of a patient, the system comprising:
   a touchless sensing device disposed within a sensing range of the patient, wherein the touchless sensing device comprises at least one touchless sensor configured to receive raw data relating to a health status of the patient; and
   at least one processor configured to:
      receive the raw data from the at least one touchless sensor;
      compute physiological data from the raw data;
      compute health metrics from the physiological data; and
      display the health metrics or the physiological data on a display device in communication with the at least one processor;
   wherein the at least one touchless sensor is configured to receive the raw data from a plurality of range bins within the sensing range while the patient is within any of the range bins, each of the raw data corresponding to a respective one of the range bins,
   wherein the raw data includes in-phase and out-of-phase quadrature data for each of the range bins such that the at least one processor is further configured to automatically select a demodulation strategy to demodulate the in-phase and out-of-phase quadrature data by comparing demodulated quadrature data against a threshold value to compute the health metrics including a respiratory waveform that is representative of the patient's chest displacement and to further reject the respiratory waveform based upon the at least one processor determining an absence of the patient from the sensing range.

2. The system of any of claim 1, wherein the at least one touchless sensor comprises at least one of a radar sensor, an ultrasonic sensor, a light sensor, or a microphone, and wherein the raw data comprises motion data and proximity data of the patient.

3. The system of claim 1, wherein the at least one touchless sensor is configured to receive raw data relating to the health status of the patient at a plurality of distances within the sensing range.

4. The system of claim 1, wherein the physiological data includes at least one of heart rate, cardiac waveform, respiration rate, respiration waveform, movement data, or sleep.

5. The system of claim 1, wherein the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, or a mood.

6. The system claim 1, wherein the health metrics include behavioral metrics comprising at least one of a time spent in bed, a time spent in a patient room away from the bed, movements or activities throughout the patient room, bed exits and entries, falls, immobile minutes in bed, or changes of position.

7. The system of claim 1, wherein at least one processor of the at least one processor is disposed within the touchless sensing device.

8. The system of claim 7, wherein at least one processor of the at least one processor is accessible by the touchless sensing device via a network.

9. The system of claim 8, wherein at least a portion of the network comprises a mesh network.

10. The system of claim 1, wherein the display device comprises a desktop computer, laptop computer, notebook computer, tablet computer, smartphone, smart watch, or smart glasses.

11. The system of claim 1, wherein computing the physiological data from the raw data involves excluding raw sensor data from people other than the patient or sources of motion other than the patient.

12. The system claim 1, wherein displaying the health metrics or physiological data includes displaying at least one of statistics, trends, alerts, insights, diagnostics, or visualizations.

13. The system of claim 1, wherein the health metrics include at least one of tachypnea, bradypnea, respiratory rate variability, tachycardia, bradycardia, heart rate variability, an upward or downward trend in respiration rate, an R score, a breathing obstruction, a shortness of breath, a ventilatory depression, apnea, a hypopnea, Kussmaul breathing, ataxic breathing, Biot breathing, Cheyne-Stokes breathing, periodic breathing, air trapping, sighing, apneustic breathing, or agonal breathing.

14. The system of claim 1, wherein the health metrics or the physiological data monitor a progression of COVID-19 symptoms.

15. A method for monitoring health of a patient, the method comprising:
   with a touchless sensing device disposed within a sensing range of the patient and comprising at least one touchless sensor, receiving raw data from a plurality of range bins within the sensing range while the patient is within any of the range bins, each of the raw data corresponding to a respective one of the range bins, each raw data relating to a health status of the patient; and
   with at least one processor:
      receiving the raw data from the at least one touchless sensor:
      computing physiological data from the raw data:
      computing health metrics from the physiological data by automatically selecting a demodulation strategy to demodulate the raw data which includes in-phase and out-of-phase quadrature data by comparing demodulated quadrature data against a threshold value for each of the range bins such that the health metrics include a respiratory waveform that is representative of the patient's chest displacement;
rejecting the respiratory waveform based upon the at least one processor determining an absence of the patient from the sensing range; and
displaying the health metrics or the physiological data on a display device in communication with the at least one processor.

16. The method of claim 15, wherein the at least one touchless sensor comprises at least one of a radar sensor, an ultrasonic sensor, a light sensor, or a microphone, and wherein the raw data comprises motion data and proximity data of the patient, and wherein the physiological data includes at least one of heart rate, cardiac waveform, respiration rate, respiratory waveform, movement data, or sleep.

17. The method of claim 15, wherein the health metrics include at least one of a hypnogram, a total sleep time, a total number of minutes asleep, a sleep efficiency, a sleep onset latency, a number of minutes awake, a percentage or duration of rapid eye movement (REM) sleep, a percentage or duration of deep sleep, a REM onset latency, a subjective sleep quality, a level of feeling refreshed, a mood, tachypnea, bradypnea, respiratory rate variability, tachycardia, bradycardia, heart rate variability, an upward or downward trend in respiration rate, an R score, a breathing obstruction, a shortness of breath, a ventilatory depression, apnea, a hypopnea, Kussmaul breathing, ataxic breathing, Biot breathing, Cheyne-Stokes breathing, periodic breathing, air trapping, sighing, apneustic breathing, agonal breathing, statistics, trends, alerts, insights, diagnostics, or visualizations, or behavioral metrics including at least one of a time spent in bed, a time spent in a patient room away from the bed, movements or activities throughout the patient room, bed exits and entries, falls, immobile minutes in bed, or changes of position.

18. The method of claim 15, wherein at least one processor of the at least one processor is accessible by the touchless sensing device via a network, and wherein at least a portion of the network comprises a mesh network.

19. The method of claim 15, wherein the display device comprises a desktop computer, laptop computer, notebook computer, tablet computer, smartphone, smart watch, or smart glasses.

20. The method of claim 15, wherein computing the physiological data from the raw data involves excluding raw sensor data from people other than the patient or movement sources other than the patient.

21. A system for monitoring health of a patient, the system comprising:
a touchless sensing device disposed within a sensing range of the patient, wherein the touchless sensing device comprises at least one touchless sensor configured to receive raw data relating to a health status of the patient; and
at least one processor configured to:
receive the raw data from the at least one touchless sensor;
compute physiological data from the raw data;
compute health metrics from the physiological data; and
display the health metrics or the physiological data on a display device in communication with the at least one processor;
wherein the at least one touchless sensor is configured to receive the raw data from a plurality of range bins within the sensing range while the patient is within any of the range bins, each of the raw data corresponding to a respective one of the range bins, and
wherein the health metrics include:
a respiratory waveform that is representative of the patient's chest displacement obtained by demodulating the raw data which includes in-phase and out-of-phase quadrature data for each of the range bins and selecting a subset of range bins which contain a valid respiratory signal measured from the patient,
a metric of respiration indicative of a respiratory pattern of the patient including respiratory rate variability, duration of inhalation and exhalation phase, and depth of breaths,
a metric of distance to the patient within the sensing range of the patient irrespective of which one of the range bins at which the respiratory waveform was measured,
a metric of movement indicative of a presence of the patient and whether the patient is at rest or not, where the metric of movement is obtained by determining a motion level at each range bin from a relative variation in in-phase and out-of-phase quadrature signal relative to a dynamically determined noise floor, and
a heart rate obtained by filtering the respiratory waveform from the raw data.

* * * * *